United States Patent [19]

Blaser

[11] Patent Number: 4,465,033

[45] Date of Patent: Aug. 14, 1984

[54] ENERGY CONVERSION CYCLE FOR INTERNAL COMBUSTION ENGINE AND APPARATUS FOR CARRYING OUT THE CYCLE

[76] Inventor: Richard F. Blaser, 214 Pierce Ave., Cape Canaveral, Fla. 32920

[21] Appl. No.: 954,623

[22] Filed: Oct. 25, 1978

[51] Int. Cl.³ .............................................. F02B 23/00
[52] U.S. Cl. ................................... 123/295; 123/657; 123/660; 123/268; 123/281; 123/279; 123/193 CP; 123/193 P
[58] Field of Search .......... 123/193 CP, 193 P, 191 S, 123/191 SP, 32 ST, 32 B, 32 C, 32 E, 32 K, 32 SP, 75 R, 75 B, 33 M, 119 D, 119 DB

[56] References Cited

U.S. PATENT DOCUMENTS

| | | |
|---|---|---|
| 1,165,086 | 12/1915 | Ford . |
| 1,803,262 | 3/1926 | Lang . |
| 1,803,263 | 5/1925 | Lang . |
| 1,816,432 | 2/1929 | Hill . |
| 1,825,658 | 3/1928 | Dumanois . |
| 1,901,838 | 3/1929 | Baur . |
| 1,937,655 | 12/1933 | Lang ................................ 123/32 E |
| 1,944,352 | 1/1934 | Lang ................................ 123/32 E |
| 2,076,030 | 7/1930 | Kahllenberger . |
| 2,076,226 | 2/1936 | Cummins . |
| 2,098,031 | 6/1935 | Essl . |
| 2,119,219 | 5/1938 | Ruth ................................. 123/32 C |
| 2,173,081 | 9/1933 | Barkeij . |
| 2,446,280 | 4/1945 | Hancock . |
| 2,573,536 | 7/1951 | Bodine, Jr. . |
| 2,662,514 | 2/1952 | Bodine, Jr. . |
| 2,662,516 | 2/1952 | Bodine, Jr. . |
| 2,662,517 | 3/1952 | Bodine, Jr. . |
| 2,758,576 | 4/1952 | Schlamann . |
| 2,991,766 | 3/1960 | Candelise . |
| 2,991,767 | 3/1960 | Candelise . |
| 3,094,974 | 6/1963 | Barber ............................ 123/32 ST |
| 3,132,633 | 5/1964 | Zimmerman .................... 123/193 P |
| 3,408,992 | 12/1966 | von Seggern et al. . |
| 3,897,769 | 8/1975 | Jozlin ............................. 123/193 SP |
| 3,898,965 | 8/1975 | Fischer . |
| 3,919,982 | 7/1973 | Goto et al. . |
| 3,923,032 | 12/1975 | Studenroth ..................... 123/193 P |
| 4,019,473 | 4/1977 | Kamiya .......................... 123/191 S |
| 4,023,541 | 5/1977 | Sakamoto et al. . |
| 4,060,059 | 11/1977 | Blaser ............................. 123/193 P |
| 4,104,989 | 8/1978 | Resler, Jr. ...................... 123/119 D |
| 4,105,008 | 8/1978 | Resler, Jr. ...................... 123/193 P |
| 4,128,092 | 12/1978 | Yokota et al. ................. 123/193 CP |

FOREIGN PATENT DOCUMENTS

| | | |
|---|---|---|
| 648651 | 8/1937 | Fed. Rep. of Germany . |
| 863222 | 3/1941 | France . |
| 351633 | 7/1931 | United Kingdom . |

OTHER PUBLICATIONS

"The Controlled Heat Balanced Cycle", by Blaser et al., presented at the 27th Meeting of Am. Physical Society, Cal. Tech., Pasadena, Calif., 25–27, Nov. 1974.
*The Naval Academy Heat Balanced Engine*, Blaser, Pouring, Keating, Rankin, Naval Academy Report E. W., 8-76, prepared under NAVSEA 0331F, Work Request N 000 2476 WR 62250, (Jun., 1976).
*The Influence of Combustion with Pressure Exchange on the Performance of Heat Balanced Internal Combustion Engines*, Pouring, Blaser, Keating and Rankin, SAE Paper 77 0120, presented at IAE C and E, Cobo Hall, Detroit, Feb. 28–Mar. 4, 1977.
*The Heat Balanced Engine-An Environmental Opportunity?* Dual Fuel Engine Project, Technical Support Dept.-Engineering Weapons Div.-U.S. Naval Academy, (Circa 1977).

*Primary Examiner*—Parshotam S. Lall
*Attorney, Agent, or Firm*—Bacon & Thomas

[57] ABSTRACT

An energy conversion cycle for an internal combustion engine and an internal combustion engine capable of carrying out the process to produce work, the process characterized by the steps of forming fuel and air charges having fuel to air proportions varying from stoichiometric at full engine power to excess air at less than full engine power conditions; increasing by compression the density and activation of the molecules of the charges supplied to a variable volume working chamber in which fuel and oxygen in the air are reacted to produce thermal potential; controlling fuel and air distribution in the working chamber so that the excess air portion of each charge is located in an air reservoir chamber that is separated from the reaction area by an open partition area separating the working and air reservoir chambers; and through the partition area, controlling availability of oxygen in the working chamber during the reaction while permitting the oxygen to be activated in a specific manner by molecular interaction with the reaction process itself across the partition area to the extent that pressures in the working and reservoir chambers are equalized during the reaction. Diffusion of molecules of activated oxygen across the partition is controlled and such molecules sustain the reaction after its initiation in a manner that the reaction is carried out with the proportion of fuel to oxygen always on the excess fuel side of stoichiometric in accordance with requisites for rapid reaction of the fuel with oxygen. The engine is characterized by an arrangement of mechanical elements and charge forming devices including moveable pistons for varying a working chamber volume; means for controlling distribution of the fuel and air so the total fuel portion of each charge is in the working chamber at initiation of each reaction with a sufficient quantity of air to insure a rapid rate of reaction between the fuel and oxygen; and means for distributing excess air of each charge in an air reservoir chamber separated from the working chamber by an open partition area having a special control function over the molecular interaction between the chamber and reservoir, such control function insuring that, during the useful work producing part of the reaction, the proportion of fuel to oxygen in the working chamber is maintained in a fuel "rich" condition.

50 Claims, 23 Drawing Figures

ENERGY CONVERSION CYCLE FOR INTERNAL COMBUSTION ENGINE AND APPARATUS FOR CARRYING OUT THE CYCLE

BACKGROUND OF THE INVENTION

1. Field of the Invention

The invention relates broadly to what conventionally is known as a combustion process of the type used in piston-type internal combustion engines, as well as combustion chamber designs for such engines and arrangements for distributing fuel and air in the combustion chambers during engine operating cycles.

2. The Prior Art

The evolution of present day automotive gasoline and high speed diesel engines has not proceeded without its share of hereditary defects that have been transmitted to each successive generation of engine designs. Modern piston engines, while representing state of the art development concepts and embodying the most sophisticated refinements known to engine designers, are increasingly subject to disparagement for their polluting emissions and their insatiable appetite for easily combusted petroleum derivative fuels.

Piston-type internal combustion engines use a variable volume working chamber for carrying out cyclic conversion of chemical energy to thermal potential by reacting highly activated fuel (e.g. hydrocarbon, alcohol or ketone) with oxygen in a rapid, dissociative chain reaction process that quasi-instantaneously generates gaseous pressure from the released energy for driving a piston that in turn moves the work producing element of the engine. Products of the reaction, which reaction is conventionally termed combustion, are exhausted to atmosphere at the end of each cycle, and the process depends in large measure for its success upon the availability of fuels that can be rapidly reacted in the brief instant that the combustion chamber is at minimum volume after each fuel and air charge is placed in the working chamber of the engine and activated by rapid mechanical compression, with or without external ignition (e.g. spark or glow discharge).

Production of intermediate reaction products due to incomplete combustion or cracking of compounds at high pressures and temperatures are known sources of polluting emissions, and the requirement for smooth, stable firing, efficient high speed engines dictates the use of liquid or gaseous hydrocarbon fuels such as gasoline or diesel fuels, with various volatility improving and anti-knock additive compounds, depending upon the particular fuel and the compression ratio of the engine for which the fuel is intended. While alcohols and other fuels have been and still are undergoing active evaluation for use in modern internal combustion engines, gasoline and other liquid hydrocarbon fuels continue to constitute the major energy source for these engines.

The need to decrease the dependence of mankind upon natural petroleum resources as the source of engine fuels is now well recognized as is the need for more creative development in the field of internal combustion engines that can more efficiently extract energy from consumed fuel of any kind without producing undesirable polluting emissions. To this end, the prior art technology has been seen to propose various reaction cycles and combustion chamber designs for achieving clean, efficient operation of Otto, Diesel and combined cycle internal combustion engines. Unfortunately, it is submitted that the various prior art proposals have failed to take into account on a microscopic level, the time bounded nature of the enormous number of minute, discrete energy releasing bond breaking events that together constitute, on a macroscopic level, the combustion event of a work producing cycle that forms the basis of operation of a typical internal combustion engine. One observes that engines apparently have been designed up until now in accordance with the concept that, in order to satisfy the needs of rapid combustion in the short time available, fuels needed to be combusted virtually instantaneously, and the best way to achieve this, at least insofar as gasoline engines were concerned, was to place a homogeneous mixture of fuel and air in the combustion chamber with the proportion of fuel to air on the rich side of stoichiometric, depending upon power and efficiency requirements, and to ignite the mixture with a high energy spark discharge to obtain a rapid expansion effect from the generated thermal potential.

This basic theory has evolved along with various economy improving and pollution controlling concepts, including modern stratified engines where a rich mixture is compressed and ignited, and the heat generated from the initial combustion is used in turn to activate and combust a much leaner mixture in the combustion chamber in a multiphase combustion process.

Insofar as Diesel engine technology is concerned, distribution of fuel and air in the combustion chamber has been controlled to promote turbulence and thorough vaporization of liquid hydrocarbon fuel injected directly into the combustion chamber, and air reservoir chambers have also been used to insure the continuous supply of air for the combustion of the initial charge. All of these measures have been considered to promote complete combustion of the fuel with various levels of success.

It has even been recognized in Diesel engine technology that fuel-free air can be distributed to an air reservoir chamber that is in communication with the combustion chamber by carefully programming the injection of fuel into the combustion chamber so that it occurs after the air portion of each charge has been initially distributed in the combustion and reservoir chambers.

More recently, the inventor himself has proposed that more complete combustion in internal combustion engine could be achieved in a multi-phased combustion process termed a Heat Balanced Cycle wherein a portion of combustion air would be segregated from the combustion chamber during the compression stroke and be permitted to participate in the combustion reaction after initial activation resulting from the initial combustion after the pressure in the combustion chamber dropped below a predetermined level during the expansion phase. In this latest approach, in the Otto cycle version, fuel and air were distributed within the combustion chamber of the engine so that a portion of air alone could be placed in the combustion chamber during the intake stroke and then transferred to the reservoir chamber during the compression stroke, free of contamination with any substantial amount of fuel. Moreover, the air supply used to carry out the secondary combustion phase involved turbulent movement of an expanding air mass into the combustion chamber through a restriction. Certain difficulties in achieving stable combustion over various operating conditions were observed and it proved to be difficult to determine combustion chamber and reservoir chamber designs, as well as restriction parameters for every engine configuration. It was also found that segregation of air from the fuel in the reservoir chamber was difficult to achieve, particularly in Otto cycle engines. It was discovered that the quenching effect of excess air admitted into the combustion chamber during the latter stage of combustion was difficult to control in a predictable manner and the operating life of engine components was severely restricted in the combustion chamber area due to the inability to control the reaction rate and the mixture proportions. However, on the other hand, it was observed that the Heat Balanced Cycle offered theoretical improvements in reduction of peak pressures and temperatures in the combustion chamber of an engine modified to carry out the cycle, improvements in fuel economy, reduction of polluting emissions, and the possibility of multi-fuel capability for such engines. This invention has as an objective the provision of a process and apparatus capable of achieving the potential that was not attainable by the previous Heat Balanced Cycle.

SUMMARY OF THE INVENTION

This invention relates to a process for converting chemical energy into thermal potential using a variable volume working chamber and associated mechanical elements of a work producing engine to cyclically cause individual charges of activated fuel and oxygen to react in a rapid dissociation process to generate heat for expanding a gas to drive a moveable piston surface or element associated with a working chamber and connected to the work output element of the engine. Engines of this type are exemplified by reciprocating or rotary piston, two and four stroke, internal combustion engines operating on Otto, Diesel or combined cycles.

The process in accordance with the invention is unique because the conversion of chemical energy into thermal potential is accomplished with minimum interference with the continuous, time-bounded, natural changes of availability, activity, composition, and energy levels of the reactants or their derivative molecular species, so that the probabilities of the completion of the reaction in the desired time interval are maximized. The process depends for its accomplishment upon the controlled distribution, activation and availability of oxygen molecules within the reaction chamber immediately before and during the reaction, so the invention also includes preferred arrangements of mechanical elements and reaction chamber geometries that enable fuel and oxygen in air to be supplied to the engine under separate control to be distributed and activated in the reaction chamber in a particular manner during each cycle of operation, and, insofar as the oxygen proportion is concerned, to be made available within the working chamber in a precisely controlled manner at the initiation of and during the reaction event.

The technical advantages of the invention are that peak cylinder pressures and temperatures are materially reduced due to the controlled reaction compared with prior art combustion processes; less undesirable polluting emissions are produced during engine operation; and the engine is less sensitive for its output and efficiency upon compression ratio and fuel characteristics such as octane or cetane numbers, volatility, flash point and viscosity.

The process according to the invention takes into account considerations related to the combustion reaction itself (i.e., the addition of heat event in each cycle) on a microscopic or molecular level and involves controlling the availability and distribution of oxygen molecules at the moment the reaction is initiated and thereafter during the reaction so that a fuel proportion in excess of stoichiometric (i.e., a "rich" mixture) is in the working chamber at the beginning of the reaction and the reaction is carried out with a rich mixture maintained in the working chamber until the reaction has proceeded to useful completion. Since this requires that excess air with part of the oxygen proportion of the reactants must be temporarily stored outside the working chamber, yet be available in highly activated form in a molecular sense to participate instantaneously in the reaction at a controlled rate, the process envisions a distribution event during intake and compression activation of the fuel and air reactants whereby the desired proportions of fuel and oxygen are located within the working chamber at the initiation of the reaction, and excess air alone is in the storage chamber, which is herein termed the "sustaining" chamber, at the moment the reaction is initiated.

It is important to the process that the excess air not be totally isolated from the working chamber during compression activation nor during the initiation of the reaction because activation of the excess oxygen molecules is intended to be continuous throughout the time that the working chamber pressure is increasing, including during the initial reaction period. For this reason, the sustaining chamber is always in communication with the working chamber volume through an open volume of predetermined size and geometry (herein sometimes referred to as the "partition volume") having as critical dimensions a minimum width, a length along the minimum width to provide a desired cross section area along the minimum width, and a depth or height between the minimum width dimension and the rearward wall of the sustaining chamber measured along a straight line extending normal to the plane including the minimum width dimension. The dimensions of the communicating volume between the working and sustaining chambers are important and will be discussed in detail in connection with the ensuing description of the drawings. It will be shown that the dimensions are important due to the fact that the success of the process depends upon the interaction of energy across the communicating volume between the chambers such that the pressures in both chambers remain substantially equal to each other throughout the cycle. In this manner, flow of gases on a macro level between chambers is controlled during the cycle while the oxygen in the sustaining chamber becomes highly activated during the compression and initial reaction events.

In order to insure on a molecular level that diffusion of activated fuel and oxygen molecules between the working and sustaining chambers is also controlled, the process requires that the geometry of the chambers and the surfaces bounding the minimum width dimension as well as the total volume that provides communication between the chambers be designed to favor a particular molecular rebound motion. Such rebound motion must favor to a maximum extent rebound of molecular activity to keep activated gaseous molecules in the working chamber and out of the sustaining chamber and activated gaseous molecules confined within the sustaining chamber, except those molecules passing directly from the sustaining chamber straight through the communicating partition volume. By controlling and restricting the molecular motion of the reactants, diffusion between chambers is controlled and the rate of oxygen participation in the reaction is controlled. With no gross flow of fuel or air between working and sustaining chambers and with controlled diffusion of reactant molecules between chambers, no significant reaction between fuel and air molecules can occur in the sustaining chamber so long as proper initial distribution of the reactants occurs.

Control over participation of oxygen during the reaction is only exercised in accordance with the process to the extent that the time-bounded requirements of the micro bond-breaking events occurring during the reaction are satisfied, and minimum interference is exercised over the natural energy liberating process itself. In addition, the control over oxygen participation in the reaction enables one to maximize reaction probabilities for the available reactants so that a maximum energy flux from a chemical to thermal potential is achieved during any cycle of operation. Thus, considerations of carburetion, mixture control, fast flame propagation, knocking, compression ratio, and so forth, which traditionally have been connected with the theory that fuel must be combusted in a single, quasi-instantaneous explosion in a combustion chamber to drive a rapidly moving piston, all become less significant in the process according to this invention. Rather, fuel and oxygen proportions in the working chamber, the activation of these proportions, the quantity of air in the sustaining chamber, the activation of oxygen in the sustaining chamber, the limitation upon free molecular motion between chambers, and the control of oxygen reactant in the working chamber at initiation of and during the reaction all become the important considerations.

In summary, therefore, the process according to the invention comprises, in its broader aspects, a process for converting chemical energy into thermal energy using a rapid dissociative chain reaction process manifesting combustion characteristics between fuel and oxygen reactants in a variable volume working chamber of a work producing engine and wherein individual charges of reactants are cyclically supplied to the working chamber and caused to rapidly react to generate a heated pressurized gas for driving a work producing piston connected to the work output element of the engine. According to the process, fuel and air charges of varying fuel air ratio related to the power demand of the engine are formed with the proportion of total air to total fuel of each charge being varied from stoichiometric at maximum power to excess air at less than maximum power. The molecular population and activation of the molecules of each charge are then increased by compression while controlling the distribution of the fuel and air reactants in the working chamber in such a manner that, when the reaction is initiated, substantially all of the fuel is located in the working chamber with a proportion of air that is less than stoichiometric and in sufficient proportion to assure a maximum potential rate of reaction of available reactants, and the balance of the charge, comprising substantially only air, is located in a sustaining air reservoir chamber of substantially fixed volume located adjacent the working chamber. The sustaining chamber is in communication with the working chamber through a molecular partition area (the cross sectional area of the open partition volume between the chambers) that is varied from a minimum first area when the working chamber is at its minimum volume to a maximum second larger area when the working chamber is at greater than minimum volume. The partition area is bounded by surfaces that favor to a maximum extent molecular rebound motion towards the working chamber of molecules of gas approaching the partition area of the working chamber side or passing through the partition area from the working chamber side or passing through the partition area towards the working chamber from the sustaining chamber side. Reaction of each charge is then initiated spontaneously by suitable activator means (e.g. a spark ignition) and the reaction is carried out in the working chamber while the working chamber is approaching and is at minimum volume and while it is expanding in a manner such that the reaction is carried out at a maximum probable rate for the available reactants with the proportion of reactants on the excess fuel side of stoichiometric throughout the reaction until the fuel has been reacted to the point that such reaction can no longer be sustained at a desired work producing rate, and using as a replenishment source activated molecular oxygen such oxygen as is naturally diffused through the partition volume into the working chamber. The cycle ends with exhausting of the working chamber near the end of each reaction in a conventional manner.

The process, in addition, contemplates varying the fuel to air proportion of each charge by only varying the quantity of fuel without varying the total quantity of air. Fuel is supplied to the working chamber usually not earlier than 30 to 50 degrees after the start of each charge intake event, and generally not later than 30 to 40 degrees before initiation of the reaction.

The process is carried out preferably with the ratio of the sustaining chamber volume to the minimum working chamber volume between 0.2 and 1.8. The width of the partition area between chambers is not less than 0.050 inch (1.27 mm) and not greater than 0.2 inch (5.08 mm).

With the process carried out using a circular piston in a cylindrical bore, the maximum partition area between chambers is between 0.05 and 0.15 times the square of the diameter of the bore. The partition volume between chambers is between 0.10 and 0.35 times the total sustaining chamber volume when the partition area is at its maximum opening.

This invention also contemplates apparatus capable of carrying out the above-described process for the conversion of chemical energy into thermal potential. Actually, the apparatus presently contemplated comprises variations of conventional engine configurations adapted to carry out the theory of the presently disclosed process. More specifically, conventional reciprocating piston engines operating on two or four stroke Otto, Diesel or combined cycles, for example, are modified to provide a working chamber, a sustaining chamber, and a molecular partition volume between the working and sustaining chambers; the fuel and air supply is modified to enable separate, independent control over both fuel and air, with the fuel control including a means for controlling the time period when fuel is admitted to the working chamber during each cycle; and the combustion chamber geometry is altered to provide surfaces disposed in certain angular relationships with respect to each other to promote desired molecular rebound for diffusion control of activated fuel and oxygen molecules in the working and sustaining chambers. Finally, the moving and non-moving elements constituting the variable volume combustion chamber are arranged so that the partition volume between chambers is variable during each cycle.

The technical advantages of the apparatus are similar to those of the process and the structural elements furthermore provide a mechanical means within the technology constituting the present state of the art for carrying out the process disclosed herein.

Accordingly, in its broader aspects, the apparatus comprises, as part of a work producing engine that cyclically converts chemical energy into thermal potential and uses the resultant heat flux to pressurize gas to cyclically drive a moveable work producing piston in the engine, a working chamber and a moveable piston or pistons in the chamber for varying its volume, and means for supplying fuel and air reactants to the working chamber, including means for independently controlling the proportion of each reactant in each charge in accordance with the power demand of the engine, but always operable so that the proportion of oxygen to fuel varies from stoichiometric at full engine power demand to a proportion in excess of stoichiometric at less than full power demand. In addition, a fixed volume sustaining air chamber is provided adjacent the working chamber and is isolated therefrom except through an open molecular partition area that is variable from a minimum first area when the working chamber is at minimum volume to a maximum second area when the working chamber is larger than minimum volume. A molecular partition volume is provided within the sustaining chamber, and the boundary surfaces surrounding and defining the working chamber, the sustaining chamber and the partition area are configured to favor to a maximum extent molecular rebound motion of gaseous molecules in the working chamber in a direction towards the central working chamber volume, rebound of gaseous molecules in the sustaining chamber but not in the partition volume, and rebound of gaseous molecules passing through the partition area from the partition volume into the working chamber towards the central working chamber volume. Means are included for controlling distribution of the reactants during the intake and activation events to cause substantially all of the fuel proportion of each charge to be located and retained in the working chamber during the activation and reaction events, with the proportion of fuel to oxygen being in excess of stoichiometric to a sufficient extent to insure a maximum potential rate of reaction for the available reactants when the reaction is initiated, and to cause the excess air molecules of each charge to be located in the sustaining chamber during the activation and reaction events. The molecular partition volume, by its configuration and size, controls the availability of activated oxygen molecules in the working chamber at initiation of and during the reaction process in a manner such that the reaction starts and proceeds to useful completion with the proportion of available fuel, including partially reacted fuel species, to oxygen always being in excess of stoichiometric. Finally, means are provided for exhausting reaction products from the working chamber after each expansion event in a conventional manner.

In addition, means are provided for controlling the timing of the fuel admission into the working chamber during each intake and activation event, and specific parameters of the ratio of the sustaining chamber volume to the minimum working chamber volume are contemplated.

Minimum and maximum partition widths are disclosed and the ratio of the maximum partition area to the diameter of the working chamber are also described. The preferred ratio between the partition volume and the total sustaining chamber volume is also disclosed.

The apparatus in accordance with this invention may comprise a single piston in a cylindrical bore, with the sustaining chamber located just below the top end of the piston in its peripheral area. In such an embodiment, the minimum radial distance between the piston peripheral top edge and the cylinder bore wall would constitute the molecular partition width. The partition width in such an embodiment is varied by utilizing a cylindrical bore having sidewall portions that converge inwardly in the vicinity of the combustion chamber of the engine at the area where the combustion chamber is at minimum volume. As the piston approaches and recedes from the converging sidewall portions, the radial distance between the top end of the piston and the cylinder bore walls varies to provide the desired variable partition width between the combustion and sustaining chambers.

The apparatus may also be arranged so that the sustaining chamber volume is located within the head of the cylinder rather than within the piston. In such embodiment, the open volume area between the combustion chamber and the sustaining chamber is varied by arranging piston and combustion chamber geometries so that a portion of the top end of the piston effectively blocks a portion of the partition area between chambers when the working chamber is at minimum volume.

An engine constructed in accordance with this invention may also utilize a pair of pistons in a single cylindrical bore wherein the space between the closed top ends of the pistons define the combustion chamber. In such an arrangement, the sustaining chamber may be provided alternatively within the pistons or within the cylindrical bores. In the former case, the variable partition width is provided by means of suitable piston geometries and in the latter case is provided by means of suitable piston and sustaining chamber geometries. In all cases, the partition area is varied between a minimum area when the reaction chamber is at minimum volume and a maximum area when the reaction chamber is larger than minimum volume.

Preferred embodiments of the process and the apparatus are described in detail below and in the accompanying drawings.

DETAILED DESCRIPTION OF THE INVENTION

Description of Drawings

With reference to the drawings appended to this specification, which illustrate preferred embodiments of the invention.

DESCRIPTION

Figure 1:
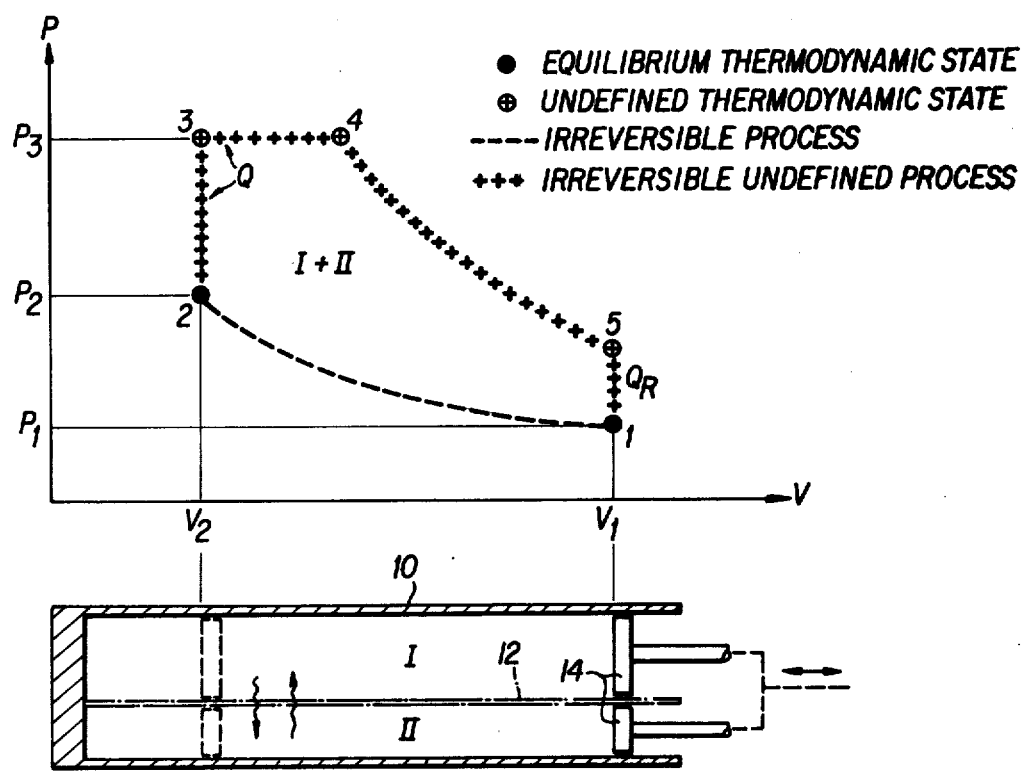
FIG. 1 is a pressure-volume diagram showing the theoretical events of a power cycle for an internal combustion engine operating in accordance with the present invention and a schematic outline of the thermodynamic system depicting a theoretical engine capable of carrying out the cycle.

With reference to FIG. 1 of the drawings, an ideal gas power cycle for an ideal internal combustion engine operating according to the present invention is represented by a plotting of pressure versus volume of gas in the variable volume working chamber of the engine during cycle events corresponding to activation (compression), addition of heat, expansion, and rejection of heat. The diagram is similar to a conventional pressure-volume diagram for conventional air standard heat engines normally used to illustrate various predictable equilibrium states reached by the gas mass during the cycle based upon certain classical assumptions that are well recognized and explained in various thermodynamic textbooks. In classical diagrams of this sort, for example, it is assumed that the equilibrium states are reached through a series of reversible processes over a closed cycle. As will be seen, this is not the case in the cycle of the present invention, and therefore, the lines between the points on the diagram are intended to graphically depict this fact.

The ideal cycle diagram shown in FIG. 1 must be considered in connection with a theoretical internal combustion engine 10 that is assumed to have variable volume working chambers divided into Regions I and II that are separated by a theoretical ideal partition 12 that is assumed to be capable of controlling interaction between the regions to the extent that the pressures within the regions are always equalized during the power cycle, while the temperatures, for example, in each region may be different at any point in time. Stated differently, and from a thermodynamic viewpoint, the internal energy status or entropy of the molecules in each region can be different, but the manifestation of average pressure within each region is always equal. As will be discussed in more detail below, this requires the assumption that the partition 12 can be variable in volume to enable the pressure-volume-temperature relationships in each region to satisfy classical equilibrium requirements when heat is added to or rejected from a mass of gas within the regions under adiabatic conditions. The volume of Regions I and II is assumed to be varied by pistons 14 that move in unison.

An ideal gas cycle for a heat engine, as is well understood, is one capable of carrying out the events of a closed power cycle over a series of reversible or irreversible processes between equilibrium states, which processes eventually return the system to its original state, and having as a fundamental function the transformation of heat, derived from conversion of chemical energy into thermal potential, into usable work. In ideal so-called internal combustion engines, the heat is cyclically drawn into the system from external reservoirs while ignoring the actual rapid dissociative chemical reactions between activated fuel components and oxygen which periodically sustain expansion of the heated reaction products to drive a moveable piston element that forms one wall of the variable volume working chamber of the engine for transforming the heat into usable work.

From a theoretical standpoint, the expected work that is available can be projected by using a pressure-volume diagram to compare the effects of varying compression ratio of different systems, that is the ratio between the total volume of the combustion or working chamber at its maximum volume and the volume of the combustion chamber at its minimum volume. However, it is believed that theoretical expectations in large part are not fulfilled in actual internal combustion piston engines due to the fact that such engines have been designed without a recognition on the part of the designers of the importance of the time factor that must be accommodated in a real engine during the addition of heat event.

Based upon a consideration of the natural progression of minute discrete events that must occur during a dissociative reaction process, such process sometimes simply being referred to as "combustion," the present invention first proposes that the combustion reaction event be described in the molecular or "micro" domain, since this is requied for the evaluation of the contribution of the time bounded requirements of the addition of heat event of the power cycle of the internal combustion engine, while recognizing that heat is supplied by converting chemical energy to thermal potential to drive a continuously moving piston element. The present invention then proposes a process and apparatus for accommodating the time requirement needed to accomplish complete reaction of the fuel component by controlling in a sustained manner the availability of activated oxygen within the working chamber during the time span corresponding to the addition of heat event in the power cycle, while controlling the proportions of reactants in the working chamber during the reaction.

In summary, the power cycle according to the present invention is based on a refinement of classical assumptions surrounding the addition of heat events during the cycle, using suitable microcoordinates (as distinguished from macrocoordinates) for describing the probability distribution function of the molecular interactions during the cycle. Such microcoordinates describe the system in the domain of modern quantum theory, statistical mechanics, statistical thermodynamics, etc., and permit the analyst to accommodate the theoretical evaluation of the time bounded minute discrete contributions of energy flux through which the supply of heat is generated.

Referring again to FIG. 1, the total system is described as a volume isolated adiabatically from the surrounding environment and filled to its maximum capacity at its stable point 1 with a mass of ideal gas. The gas is composed of a charge of ideal molecules capable of reacting in a manner resulting in the conversion of the chemical potential of the charge into a preestablished quantity or value Q of thermal potential. The points 1 and 2 shown as solid dots are assumed to be equilibrium states in the power cycle, the same as a conventional pressure-volume diagram, where points 1 and 2 represent the pressure-volume relationship of the gas in the combined working chamber Regions I and II, assuming no heat flow from or into the system, and assuming that the partition 12 permits pressure equalization but not necessarily temperature or other internal energy equalization between the regions. Between points 1 and 2, the gas in Regions I and II is adiabatically compressed by reducing the workig chamber volume by means of piston or pistons 14 and the pressure and temperature of the gas increases to reflect the increased internal energy of the gas molecules. The density, or population, of the gas is also increased, naturally, and point 2 therefore represents an equilibrium state of the gases in Regions I and II that has been reached through a series of irreversible minute processes or events of conversion of externally supplied mechanical energy into internal energy of the system.

A quantity of heat Q is assumed to be added to the system according to the present invention starting at point 2 and it is assumed also that a portion of the total heat Q is added at constant volume and the remainder portion of the total heat is added at constant pressure. States 3 and 4 of the system are shown as a circle within a cross to indicate that these are undefined states and they are connected by cross lines to indicate that the thermodynamic process is undefined and irreversible, since neither state in the process can be defined using macro thermodynamic coordinates of the system. The net effect, however, can be plotted on the pressure-volume scales in the manner illustrated to allow a non-equilibrium thermodynamic representation of the cycle.

A careful analysis of points 3 and 4 requires one to consider that the first of the total heat portion is assumed to be added to Region I as a continuous, yet quasi-instantaneous series of minute energy releasing events assumed to occur along an irreversible constant volume path. The partition 12 between regions allows pressure in Region II to follow pressure in Region I, but the temperature in Region II does not follow the temperature in Region I. The system therefore cannot be defined in equilibrium terms at point 3, and furthermore the assumed capabilities of partition 12 must satisfy the natural classical pressure-volume-temperature relationships of the gases that must exist at point 3. In actuality, the partition 12, as point 3 is approached, must accommodate the change in volume of Region II that must exist at point 3. This will be explained in somewhat more detail below in connection with the description of FIG. 3.

The remaining heat proportion is assumed to be added to the system at point 3 also in a continuous, time bounded irreversible series of minute energy conversion events. Since the partition 12 permits interchange to the extent that pressures in each region remain equalized, the states of Region I at points 3 and 4 are identical since the temperatures and pressures in Region I are unchanged. However, Region II reaches a new state at point 4 as a result of the additional, secondary heat conribution. Now, the temperatures between Regions I and II are different, so the system is not at equilibrium at point 4, requiring that the partition 12 once again must accommodate the gas pressure-volume-temperature relationships then extant in the Regions I and II.

From point 4 to point 5, the gas in the working chamber is permitted to expand adiabatically until the chamber is at its original volume, and thereafter heat $Q_R$ is rejected from the system to return the latter to its original starting point 1. The state of the system at point 5 again is undefined because the temperature of the mass in Regions I and II are different. At point 1 again, the pressures and temperatures are equalized and the state of both regions returns to starting conditions.

The pressure-volume diagram of FIG. 1 resembles the theoretical pressure-volume of a classical combined Otto-Diesel cycle wherein a portion of fuel is combusted at constant volume and a portion combusted at constant pressure. However, it will be seen that, in actuality, the process according to the present invention prolongs the heat input event by supplying a suitable, fast reacting charge of reactants in the working chamber before the reaction is initiated, and thereafter accommodates the natural time requirements of the reaction by continuously supplying activated oxygen before, during and after initiation of the reaction, without regard to constant volumes or constant pressure conditions.

Figure 2:
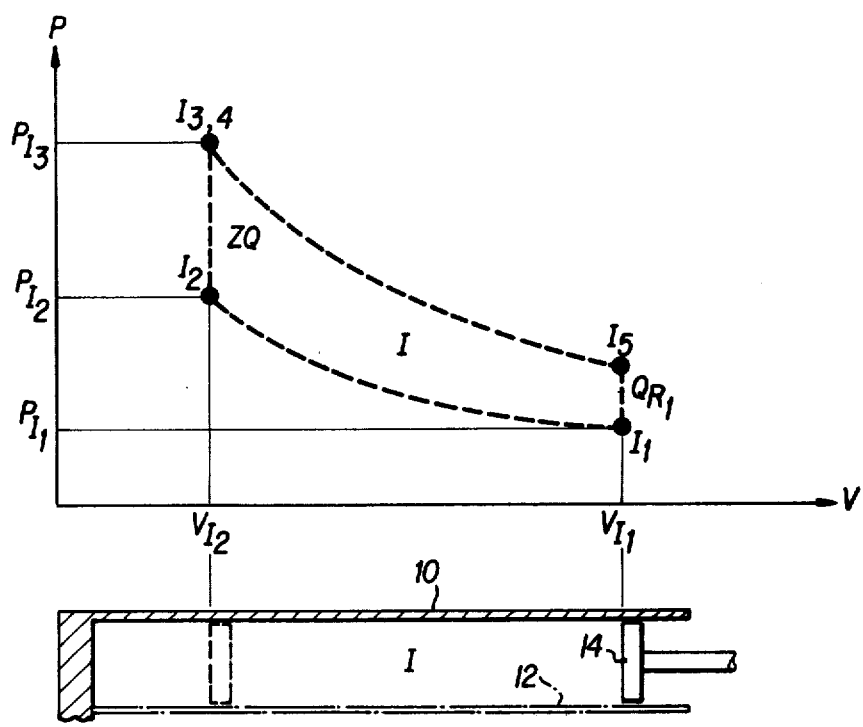
FIG. 2 is similar to FIG. 1, showing the contribution of Region I to the events of the power cycle of the engine depicted in FIG. 1.
Figure 3:
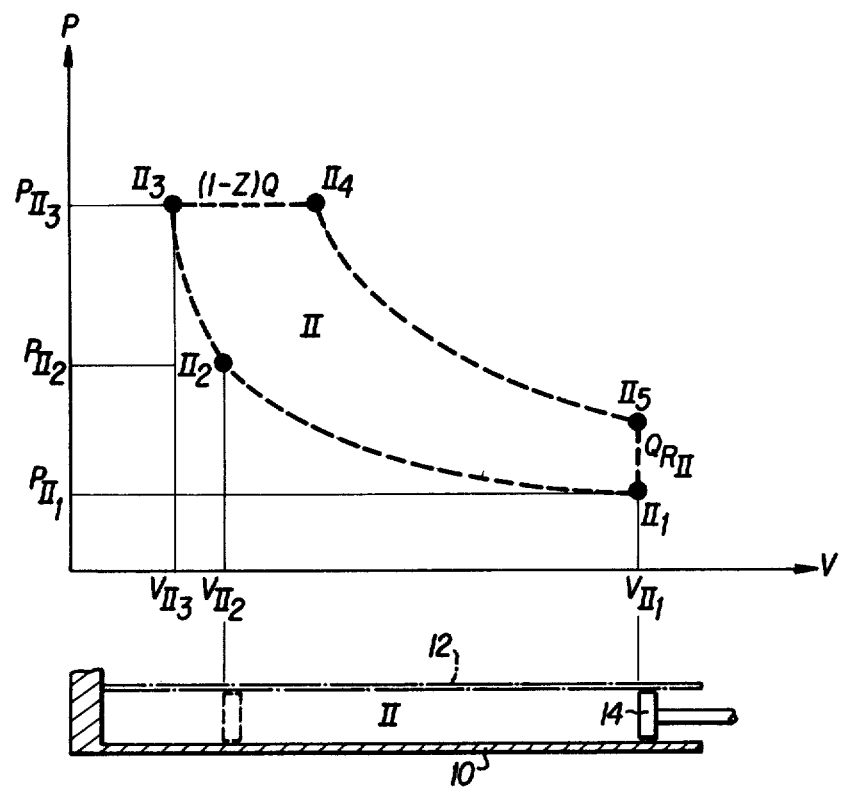
FIG. 3 is similar to FIG. 1, showing the contributions of Region II to the events of the power cycle of the engine depicted in FIG. 1.

In FIGS. 2 and 3, a closer analysis of what transpires in each of Regions I and II during the cycle is shown, and helps one to further understand the theoretical basis for the process of the invention. In FIG. 2, Region I is shown as it changes its states during the cycle, while in FIG. 3, Region II is depicted to show it various states along the same cycle, assuming the existence of the theoretical partition 12.

In FIGS. 2 and 3, both Regions I and II reach state 2 along the same process as is depicted in FIG. 1. Heat portions ZQ and (1-Z)Q of the total heat added Q are then respectively assumed to be supplied to the system in Regions I and II. In FIG. 2, the states of Region I at points 3 and 4 as a result of the assumed supply of heat ZQ in Region I are the same because the pressure, volume, and temperature of the gas in Region I are unchanged as the total system approaches states 3 and 4. In FIG. 3, on the other hand, it is evident that the Region II adiabatically proceeds from its state at point 2 to its state at point 3, since it shares the pressure increase occurring in Region I as a result of the additon of heat event in Region I. Point 3 for Region II therefore must lie to the left of point 2 on the pressure-volume diagram. The adiabatic pressure increase in Region II must also be assumed to be accompanied by a decrease in volume of the gas in Region II, with the partition 12 accommodating the volume differential, since the temperatures in Regions I and II at points 3 and 4 are different, and the sum of the volumes in Regions I and II at state 3 will no longer be theoretically equal to the total volumes of Regions I and II at point 1. When the heat portion (1-Z)Q is assumed to be supplied to Region II at constant pressure, FIG. 3 illustrates that the state of Region II approaches point 4 along an irreversible path as shown. The state of the system in Region I is unchanged because the pressure and volume in Region I is not affected by the assumed addition of heat in Region II. Adiabatic expansion of Region II to point 5 then follows, and rejection of heat between points 5 and 1 returns the system to starting conditions.

The ideal equilibrium and quasi-equilibrium assumptions in the macro domain of a classic thermodynamic heat balanced cycle proposed for heat engines, when compared with Air Standard Otto and Diesel cycles, reveals that for equal gas mass, compression ratio and total heat input, the heat balanced cycle can theoretically produce lower peak pressure and higher mean effective pressure than the Otto cycle and is capable of operating with a higher thermal efficiency than the comparable Otto cycle. The above comparisons, of course, are based on theoretical thermodynamic calculations and assume that the system follows reversible processes between equilibrium states and that heat inputs can be separately maintained. The latter, of course, represents an accomplishment that is difficult to achieve in a real engine.

In the power cycle of the present invention, the theoretical limit of the "heat balanced" cycle is fully scientifically and technologically refined in a manner that accommodates real internal combustion engine environments. The use of a micro point of view for describing the irreversible processes constituting the events of the cycle recognizes the micro domain which is required for evaluating the contributions of the minute, discrete, enormous number of time bounded events through which energy conversion occurs. Accordingly, fuel and oxygen quantity and distribution controls are used in conjunction with a working chamber and piston geometry that enables better separation of the heat input contributions of what can roughly be considered the functional equivalents of the theoretical Regions I and II.

In the present inventon, the separate regions in the real cycle are embodied in a variable volume working chamber that is in constant communication with an auxiliary fixed volume air chamber called a "sustaining chamber" through an open partition area and/or volume between the chambers. The partition area or volume is carefully controlled in size throughout the cycle and varies from a minimum at initiation of the reaction to a maximum during the expansion state of the cycle. At all times, the communicating area and volume enable pressure equalization between chambers, but travel of molecules of gases between chambers promoted by molecular internal energy differential between the chambers is controlled by careful design of the solid surfaces surrounding the communicating area and volume. By distributing the fuel and oxygen components so that all the fuel is in the working chamber and the oxygen (supplied in air) is divided between the working and sustaining chambers in a predetermined ratio, and thereafter activating the components both by mechanical compression and the reaction process itself, and finally controlling sustained participation of the highly activated oxygen in the reaction during the cycle, the following occurs. The reaction is initiated and proceeds to useful completion with the proportion of partially unreacted fuel to uncombined oxygen always on the fuel rich side of stoichiometric; the probabilities of successful collision between fuel and oxygen molecules (including molecules of various intermediate fuel species and oxygen) in the working chamber is maximized; and the time requirements for completion of the reaction are accommodated during the cycle. As a result, a more natural progression of energy releasing bond breaking events occurs during the reaction, beginning with dissociation of unstable "easy" bonds, followed by dissociation of the more stable "hard" bonds characteristic of various species of partially reacted fuel.

The foregoing advantages must be compared with and evaluated against prior art combustion processes, in which the quasi-instantaneous combustion of a normally rich, near stoichiometric homogenous mixture of fuel and air resulted in virtually total utilization of available high energy oxygen to rapidly break the unstable bonds between fuel molecules to release energy at a high rate which resulted in complete depletion of oxygen required to react with more stable intermediate fuel molecular species. The prior art combustion reaction classically went from its initial, usually "rich" condition, to a richer and richer oxygen deprived condition, with resultant production of undesirable products of incomplete combustion under high pressure and temperature conditions which promoted dissociation of products of combustion and molecular species of nitrogen and carbon. Attempts in the prior art to provide a "sustained" supply of oxygen by various lean combustion techniques has required, on the part of engine designers, a precarious balance between stable, power producing combustion on one side, and quenching of combustion before completion on the other side because the proportion of remaining fuel to remaining oxygen normally proceeds to the lean side in such processes until the mixture is outside the flammability limits. High manufacturing costs and the danger of poor engine performance, of course, are endemic to lean burn engine configurations.

The process according to the present invention can best be understood in the context of specific engine configurations arranged to carry out the process. The exemplary engine embodiments to be considered are specifically configured as variations of existing reciprocating type internal combustion engines operating in Otto or Diesel modes, 2 or 4 stroke power cycles, with spark, glow or spontaneous ignition systems. The principles to be discussed are equally applicable to rotary piston engines or engines with reciprocating cylinders and "fixed" pistons, and it is not intended to imply that the process of the present invention can only be carried out using such "conventional" engine configurations.

Figure 10:
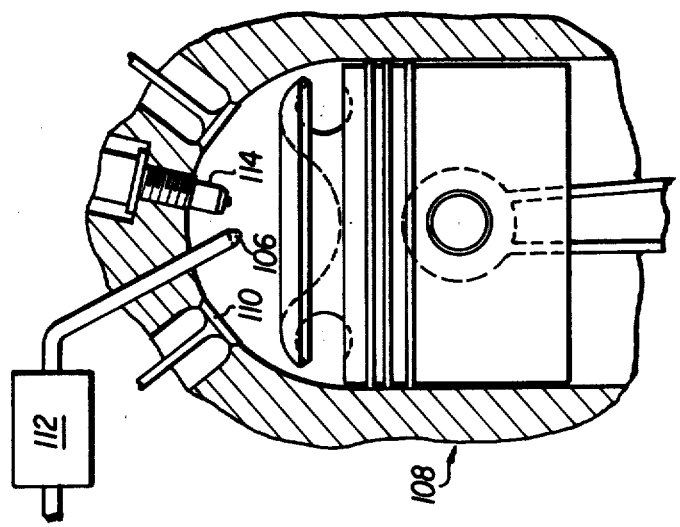
FIG. 10 shows still another alternate embodiment of the fuel and air supply system for the engine illustrated in FIG. 4.
Figure 9:
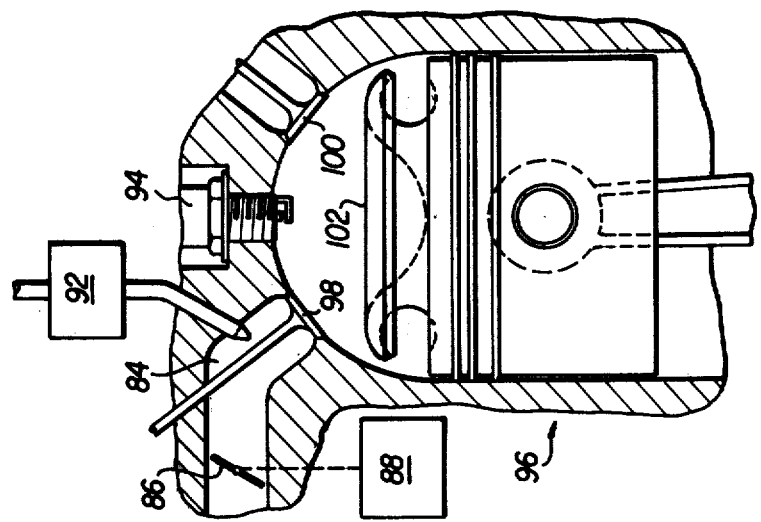
FIG. 9 schematically shows an alternate embodiment of the fuel and air supply system for the engine illustrated in FIG. 4.

In FIGS. 4 through 7, an exemplary combustion chamber geometry suitable for carrying out the process is illustrated. Typical possible fuel and air supply and distribution systems for such an engine are illustrated in FIGS. 8 through 10, while FIGS. 13 and 14 graphically depict timing of various intake, activation, reaction and exhaust events in the context of a piston driving a rotary output shaft over a four stroke Otto and Diesel cycle, respectively.

Figure 4:
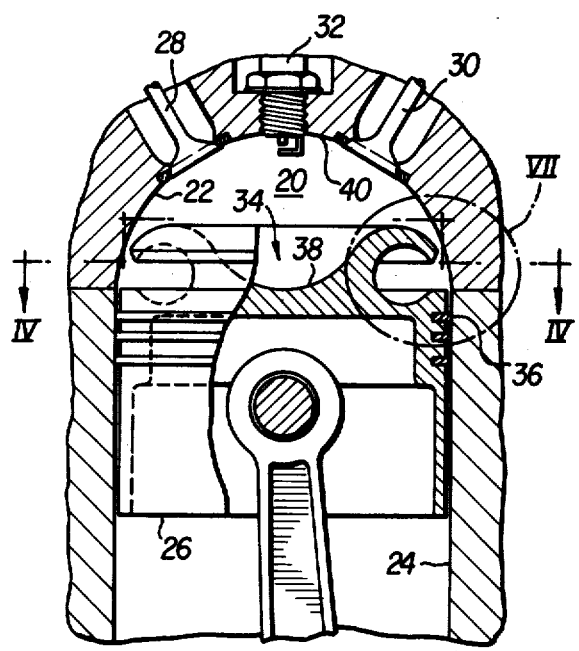
FIG. 4 shows a side elevational sectional view of a working chamber layout of an actual engine for carrying out the process in accordance with one embodiment of the invention.

With reference to FIG. 4, a working (combustion) chamber arrangement is illustrated as an example of one form of apparatus that could be used to carry out the process of the present invention. The working chamber 20 is a variable volume chamber defined by concave arcuate sidewall portions or areas 22 at the head end of a cylindrical bore 24, and a piston 26 reciprocally mounted in the bore 24 for varying the volume of the chamber 20 between a minimum value when the piston is at top dead center position and a maximum when the piston is at the bottom of its stroke (assuming here that the piston 26 is connected to the usual rotary crankshaft). The usual inlet and outlet valves 28, 30 for cyclically admitting fuel and air and exhausting products of reaction into and out of the chamber 20 are shown, along with a spark plug or igniter 32. This type of engine is an air breathing engine, whereby the oxygen portion of the reactant is supplied by the air.

Fuel and air are cyclically supplied to working chamber 20, activated by compression, ignited and reacted to generate thermal potential which is converted to work via the piston 26, and the products of reaction are exhausted from the chamber. The spark plug initiates the reaction, which is essentially a dissociative, energy releasing chain reaction between some type of fuel molecules (usually hydrocarbon, hydrocarbon derivative, alcohol and or ketone) and oxygen. The released heat increases the pressure of the gas in the working chamber 20 to drive the piston 26 to produce work in the usual manner. The energy releasing event can occur every other stroke of the piston or every fourth stroke of the piston to achieve a two cycle or four cycle operation, as is well understood. Ignition can be by spark, glow plug, or by spontaneous ignition. Fuel and air can be aspirated or injected under pressure, or a combination of aspiration and injection.

The head end of the bore 26 is at the top as seen in FIG. 4, and it can be seen that the closed top end or working surface 34 of piston 26 lies above an upper compression seal 36 on the periphery of the piston 26, as shown. The central portion 38 of the top working surface of piston 26 is concave arcuate in form and cooperates with the concave arcuate end area 40 of the bore 24 to form a generally spherical working chamber 20 when the latter is at its minimum volume. At the outer peripheral area of the top of piston 26 a chamber 42 of substantially fixed volume called a "sustaining" chamber is provided, this chamber being located in this instance between the top sealing means 36 and the extreme top end area 44 of piston 26.

A radial clearance gap 46 (see FIG. 6) defines a minimum width of an open area or volume that provides continuously open communication between chambers 20 and 42. The gap 46 has a peripheral length so that a partition area defined as the width of the gap at its minimum transverse dimension times the length of the gap is provided between the chambers. In this example, the gap extends entirely around the piston, but this need not always be the case. Likewise, the partition length need not be continuous, nor does the gap width need to be constant.

Figure 6:
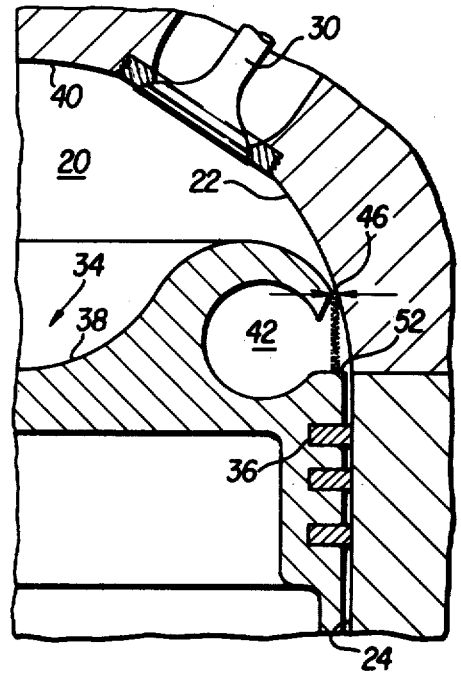
FIG. 6 is an enlarged detail view of the area generally bounded by circular line VI in FIG. 4.
Figure 7:
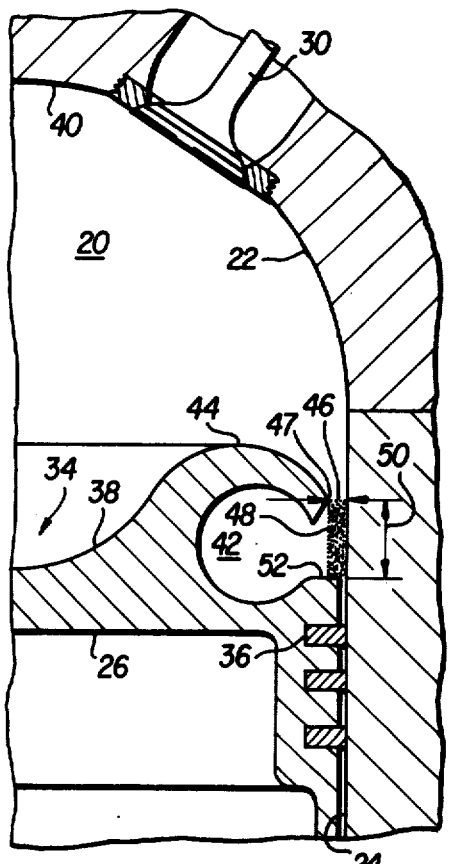
FIG. 7 is similar to FIG. 6 but shows the piston of the engine lower than top dead center.
Figure 8:
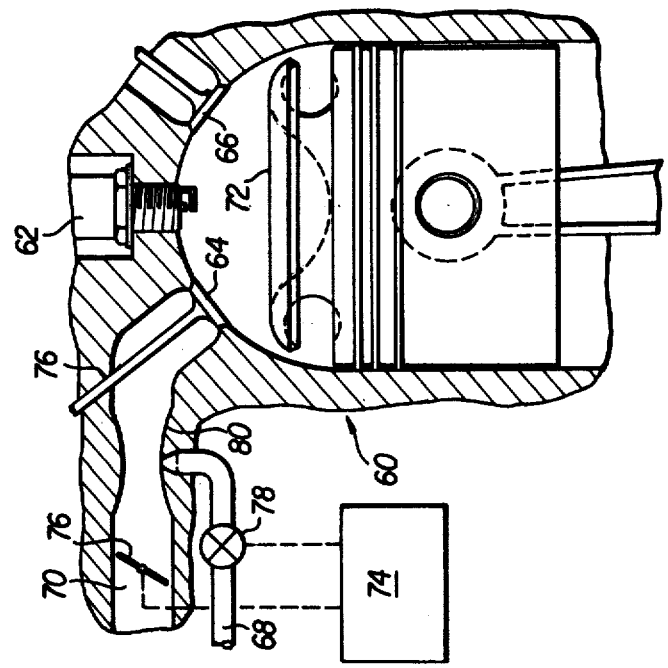
FIG. 8 schematically shows the fuel and air supply system for the engine illustrated in FIG. 4.

As will be evident by comparing FIGS. 4, 6 and 7, the transverse gap 46 varies from a minimum when the working chamber 20 is at minimum volume (FIG. 6) to a maximum (FIG. 7) when the piston 26 is away from its top dead center position, due to the inward convergence of the sidewall area 22 of the head end of the cylinder bore 24. That is, when the piston 26 is at the top of its stroke as shown in FIG. 6, the peripheral area of the top end of the piston more closely approaches the cylinder bore sidewall 22 than when the piston is away from its top dead center position as shown in FIG. 7.

In addition, the solid boundary surfaces leading towards and extending away from the gap 46 are specifically contoured to favor rebound of molecular motion in a particular fashion. Specifically, the boundary surfaces are configured to favor to a maximum extent the rebound motion of molecules in such a manner that most of the molecules within the working chamber 20 tend to remain within the working chamber and only a relatively small quantity tend to diffuse into the sustaining chamber 42. Moreover, due to the curvature of the sidewalls of chamber 20, the highly energized molecules in chamber 20 striking its sidewalls tend to rebound ultimately back towards the central region of the chamber as a focal point or area. Thus, looking at FIG. 6, the arcuate convex curvature of the top end surface 44 of piston 26, the concave curvature of surface 38, and the concave curvature of surfaces 22 and 40, all combine to favor rebound of molecular motion originating in chamber 20 back into the chamber 20 and to discourage migration of molecules into the sustaining chamber. It is desirable to avoid straight line-of-sight paths leading from chamber 20 into sustaining chamber 42 in order to favor maximum rebound motion and minimum diffusion of fuel molecules into the sustaining chamber 42. Preferably, rebound motion is directed towards the central region of chamber 20.

It will be seen that the gap 46 itself extends between a sharp lip 47 at the top peripheral area of the piston 26 and the sidewall of the bore. On the other side of the gap 42, that is within the sustaining chamber region 42, the interior sidewalls of the central region of the chamber are spherical in cross section as shown in FIG. 6. The spherical contour here tends to cause the molecules moving within chamber 42 to rebound back towards the region 42, preferably its central region, and not to diffuse out through the partition gap 46 into the working chamber 20. Molecules moving from chamber 42 through the gap 46 towards chamber 20, tend to rebound toward chamber 20 and back into chamber 42. However, the shaded area shown in FIG. 7 represents a volume 48 defined by the partition area (partition width times partition length) projected over the straight line distance 50 extending between the gap 46 and the back wall 52 of the sustaining chamber 42. The distance 50 represents a depth dimension of the volume 48 that always extends normal to the gap dimension 46, whether the latter is at its minimum or maximum dimension (FIG. 6 or FIG. 7, respectively). The gap 46, of course, shall always be the minimum transverse dimension across the open area between chambers 20 and 42, regardless of piston size, shape or position, or gap configuration. The volume 48 shall extend along a straight line-of-sight vector between the gap 46 and the back wall 50 in chamber 42, since this volume has a very important function in the present invention, as does the gap area 46.

It will also be seen in FIGS. 4-7 that the sustaining chamber 42 is located within the top peripheral area of the piston 26 and is defined in this embodiment by a chamber 42 within the piston 26 that is partially closed along one side by the cylinder sidewall, except for the gap 46. The chamber 42, of couse, will always be above the top sealing means 36 so that molecular interaction across the gap 46 between chambers 20 and 42 can occur in a controlled manner.

The theory of the invention is based upon the sustained control of oxygen availability within chamber 20 during very critical time periods in the energy conversion cycle. Such time periods are at initiation of the reaction, during the period when the working chamber is at minimum volume, and during the expansion of the working chamber volume. The theory also requires that fuel and oxygen reactants be cyclically distributed within the engine working chamber in such a manner that the fuel proportion of each charge is entirely within chamber 20 upon completion of each compression stroke of the piston (in the micro domain, upon completion of the activation event) and a proportion of the oxygen bearing air be disposed in the sustaining chamber 42, where it becomes compressed and highly activated both by mechanical compression and the reaction process itself.

It should be mentioned at this time that during the power cycles there is no or very little macroscopic flow of gases between chambers 20 and 42, particularly during the reaction event. The molecular interchange that occurs across the gap is such that the pressures in the chambers 20 and 42 always tend to equalize throughout the cycle with minimum macro flow between the chambers.

The curvature of the surfaces defining the working chamber are such that highly activated fuel molecules, including species of partially reacted fuel molecules tend not to travel into the sustaining chamber through the gap 46. The probabilities of successful collision of those isolated fuel molecules migrating below the gap are highly diminished because with the large population of oxygen molecules in the partition volume 48 causes the proportion of fuel to oxygen to proceed towards the lean side to the extent that the rate of reaction is virtually zero. Thus, another key factor in the process is the absence of any substantial energy releasing reaction between fuel and oxygen in the sustaining chamber area 42.

The quantity of oxygen made available for participation in any reaction occurring within chamber 20 is, according to the invention, dependent primarily upon the size of the partition volume 48, since it is only along this straight line path that activated molecules of oxygen can readily migrate into the reaction chamber 20. Since the volume 48 can be controlled by controlling the gap width and length, as well as the height or depth 50, the oxygen participation in the working chamber 20 can be controlled in any desired manner once the proper distribution of fuel and air has been established at the start of the reaction corresponding to point 2 of the diagram in FIG. 1.

Since the reaction charge in the working chamber 20 at the beginning of the reaction will be controlled by the fuel and air distribution system (to be explained below in connection with FIGS. 8-10) so that a charge that is on the "rich", or excess fuel side of stoichiometric proportions is contained within the working chamber when the reaction is initiated, it is very important for the process that additional oxygen availability in chamber 20 be strictly limited at the time of initiation of the reaction (i.e. ignition of the charge) corresponding roughly to the constant volume portion of the pressure-volume diagram in FIG. 1 (from points 2 to 3). However, when the reaction proceeds, since initial oxygen is depleted in the reaction, additional oxygen must be supplied to maintain the proportion of fuel to oxygen near stoichiometric to insure maintenance of the reaction at the maximum expected rate.

Thus, the partition volume 48 is varied from a minimum value when the working chamber is at minimum volume as shown in FIG. 6, to a maximum value when the chamber size is greater than minimum volume, as shown in FIG. 7. Migration of molecules of oxygen from chamber 42 into working chamber 20 is therefore minimal as the working chamber approaches and is at minimum volume, but increases and sustains the required charge proportions as the reaction proceeds during the expansion of the working chamber.

It must be remembered that oxygen availability in the working chamber 20 does not result from a substantial macroscopic flow of air out of chamber 42 into chamber 20 during the reaction, as will be explained below. Rather, diffusion-like motion sustains the migration of molecules from chamber 42 into chamber 20 despite pressure equalization between the chambers, due to the fact that random energy distribution of the molecules with the chambers are different during the reaction. Since the temperatures are different while the pressures are the same, the population of molecules in the chamber 42 is greater than the population of molecules in chamber 20. Accordingly, movement of high energy oxygen molecules from the sustaining chamber 43 through the partition volume 48 and through the partition area or gap 46 into chamber 20 will occur at a rate that is dependent upon the parameters of the partition volume 48, and will be favored in order to maintain pressure equilibrium.

The next matter considered to be important in the process is the quantitative amount of oxygen participation that can be permitted during each reaction. This requires, as a prerequisite, a consideration of the objectives sought in controlling oxygen availability in the working chamber during the reaction. Essentially, there is sufficient oxygen availability in the chamber 20 at initiation of the reaction to sustain the major part of the chain reaction between fuel and oxygen and to carry out a large portion of the heat releasing events of the cycle by converting chemical energy into thermal potential through the molecular dissociation of the fuel molecules. Yet, only the relatively instable bonds are broken during the initial part of the reaction, and this leaves the more stable bonds between fuel and fuel species to be dissociated. In prior art combustion processes, as has been stated, means were not available to supply oxygen molecules into the reaction zone with sufficient energy levels to cause further dissociation of the molecules having strongly affinitive bonds, nor was there a way available to control the rate at which such oxygen could be supplied on a sustained level to enable the reaction to proceed along its natural combustive course at a maximum rate without the usual restrictive constraints imposed by engine designs based upon virtually instantaneous combustion of a homogenous fuel mixture.

Accordingly, the process here requires that, first, the charge of reactants initially in the working chamber 20 be on the fuel "rich" side of stoichiometric, and, secondly, that the fuel proportion of reactants in chamber 20 be maintained on the rich side until the reaction has proceeded to useful completion (i.e., until the rate of heat release is insufficient to perform more useful work). The partition volume and partition area, therefore, must be configured and dimensioned so that for any working chamber, oxygen replenishment into the working chamber during the useful part of the reaction will sustain the proportions of the remaining reactants in the chamber 20 (including, oxygen, fuel, and partially reacted fuel species) on the rich side of stoichiometric for maintaining the probability of maximum reaction rate.

For different required performances, fuels and geometries, the following limits, or ranges of values, will insure such control over oxygen availability in a combustion chamber configured generally in accordance with FIGS. 4–7 and 15–20 in the drawings. The ratio of the sustaining chamber volume to the working chamber volume should lie between 0.2 and 1.8 for most engines, since a higher ratio tends to promote excess availability of activated oxygen into the working chamber and the oxygen participation in the reaction is difficult to control. The gap width 46 at its smallest dimension should not be much less than 0.050 in. (1.27 mm), because a smaller gap is not conducive to the desired interchange between working and sustaining chambers during the cycle. For related reasons, the gap 46 should never be much greater than 0.20 in. (5.08 mm) to prevent substantial mass flow of air from the sustaining chamber during the expansion phase of the reaction and to prevent fuel contamination in the sustaining chamber during the reaction.

The maximum total partition area along the gap 46 should be between approximately 0.05 and 0.15 times the square of the diameter of the working chamber or cylindrical bore to permit one to limit total oxygen availability in the working chamber. The partition volume 48 should be approximately between 0.10 and 0.35 times the total sustaining chamber volume when the partition gap 46 is at its maximum opening to achieve proper diffusion control over the activated oxygen.

There remains to be explained, for a fuller understanding of the process, how the fuel and air constituents are distributed in the working and sustaining chambers to achieve the separation of a portion of air of each charge between the working and sustaining chambers, with minimum contamination of fuel molecules in the sustaining chamber, and while assuring the presence of a desired fuel and air mixture in the reaction chamber. The distribution of the fuel and air must occur during the compression activation event and be maintained to a large extent during the reaction itself. The working and sustaining chamber geometries, the fuel and air supply systems, and appropriate controls over the timed relationship between the supply of fuel and air during each cycle must all function in a harmonious manner to achieve the desired distribution of reactants in the working and sustaining chambers by the time the reaction is initiated during each power cycle.

First considering broad approaches to the supply system for fuel and air, and more particularly, the system for cyclically forming fuel and air charges, FIGS. 8 through 10 schematically illustrate how typical systems can be arranged to achieve the desired fuel distribution in various engine configurations. In the embodiment shown in FIG. 8, an engine 60 having a working chamber generally constructed in accordance with FIG. 4 is illustrated, including a spark ignition plug 62, inlet and exhaust valves 64, 66, a source of fuel 68, and an air line 70. Fuel and air in this embodiment are independently aspirated into the working chamber during each intake event and, after activation, the fuel and air charge is ignited to initiate the combustive reaction between the fuel and oxygen reactants to drive the piston 72 to produce work. The fuel and air supply are independently regulated by a suitable control system schematically shown at 74. A central control unit 74 associated with a throttle or power regulator for the engine adjusts the position of an air valve 76 so that the valve remains essentially open except in the idle regime. Air is thus aspirated into the working chamber without additional constraints in response to power demand of the engine. Fuel flow, on the other hand, is controlled by a valve 78 so that the amount of fuel aspirated into the working chamber through the intake valve 64 varies as a function of the power demand of the engine. Fuel flow could be induced by means of a conventional venturi 80 or by other suitable means.

The important aspect of the fuel and air supply control system is that the relationship of total fuel and air proportions in each charge only varies from stoichiometric at full power demand to an excess of air at less than maximum power operating conditions. That is to say, except at full power, when the charge proportions approach stoichiometric, the charge proportions will always be on the "lean" or excess air side of stoichiometric and never on the rich side, with only the fuel proportion being varied in accordance with power demand.

Other fuel supply and control systems could be based upon pressurized injection of fuel into the intake manifold, as shown in FIG. 9. In FIG. 9, an intake pipe or manifold 84 includes an idle control air valve 86 regulated by controller 88, a fuel injector nozzle 90 and a timed injection controller 92 connected to a fuel supply. A plug 94 could be spark or glow type and the engine 96 includes the usual intake and exhaust valves 98, 100, respectively, and piston 102. Fuel would be supplied under moderate pressure in timed relation to each intake event during the intake stroke of the piston 102. Only the fuel quantity would be controlled in response to the power demand of the engine, and the proportion of fuel to air in each charge would always be in accordance with the principles set forth in connection with the discussion relating to FIG. 8.

In FIG. 10, still another embodiment of the fuel supply is illustrated, including a pressurized fuel injector nozzle 106 used to inject fuel directly into the working chamber of the engine 108. Air is aspirated normally through air inlet valve 110, and the fuel is supplied to the nozzle 106 under pressure through an injector system 112 of the general type well known in the art. The fuel injector system supplies a controlled quantity of liquid fuel into the reation chamber in timed relationship with the piston strokes to achieve the desired fuel and air distribution in the working chamber. A glow plug 114 may be utilized for starting the engine, but as a general rule the reaction will be initiated in this embodiment by compression ignition. The fuel to air ratio of the charge in this embodiment varies as that for engines described in FIGS. 8 and 9.

It will thus become apparent that the timed nature of the fuel supply is of great importance in the process of this invention, as is the charge control. For a better understanding of the timed or phased relationship between fuel admission into the working chamber and the engine operation, again it is important to understand that the objective that is sought is twofold: First, to distribute the fuel and air in the working and sustaining chamber so that the air in the sustaining chamber is completely separate from the charge in the working chamber; and second, to distribute the fuel and air so that the proportions of the reactant charge in the working chamber is always on the fuel rich side of stoichiometric at initiation of the reaction (i.e., ignition). The rich proportions of the charge in the working chamber favor an optimum rate of reaction for the available fuel, considering the chemical composition of the fuel, the particular engine configuration and the working chamber geometry. To achieve such a distribution, the fuel to air proportions of the supplied charge are varied as explained previously, but, just as importantly, the fuel must be admitted into the working chamber in a specific timed relationship with the variation of volume of the working chamber during the intake and compression events of the cycle, such timed relationship being selected from a broad range compatible with the process.

Figure 11:
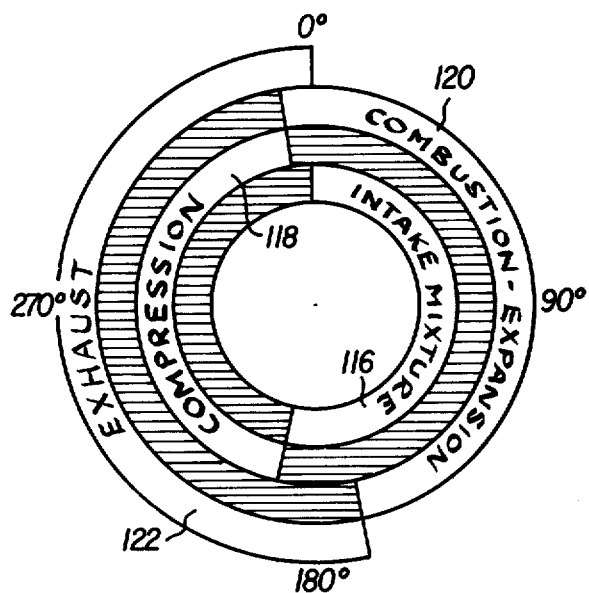
FIGS. 11 and 12 graphically illustrate prior art Otto and Diesel four stroke power cycle events in timed relationship with a rotary power output shaft.
Figure 12:
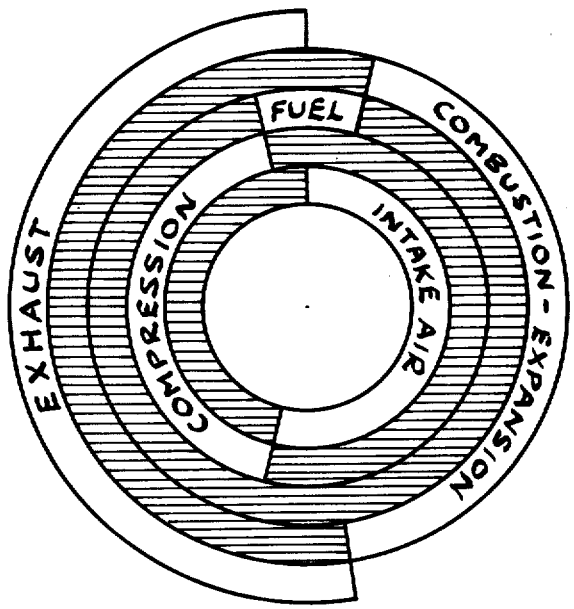

In FIGS. 11 and 12, generally conventional timing of fuel and air supply to a combustion chamber of an internal combustion engine is graphically depicted by a standard circular graph or chart comprising multiple concentric circles that illustrate the cycle beginning with the innermost circular segment and ending with the outermost segment. The angular coordinates of the chart coincide with the angular positions of the power output shaft of an engine capable of carrying out the cycle illustrated in the chart. Thus, in FIG. 11, intake of fuel and air in a conventional Otto cycle engine occurs as an aspiration of a homogenous mixture of fuel and air over the period of shaft rotation shown on the innermost circular segment 116, that is, from about 0° up to about 190° of shaft rotation during an intake stroke, depending upon the timing of intake valve closure. Compression then occurs up to a few degrees before piston top dead center (0°) as shown by segment 118, at which point ignition occurs followed by quasi-instantaneous combustion and then expansion over the rotation period covered by the next outer segment 120. The exhaust phase is shown at segment 122. The cycle of FIG. 11 is a four stroke cycle and it can readily be seen how the fuel and air mixture according to this cycle must be completely placed within the combustion chamber as a readily and quickly combustible mixture during each intake event, and that very little control is available over the supply of the fuel component other than as part of the total aspirated mixture charge. It is well known, of course, that timed fuel injectors can be used to more carefully control the mixture in the combustion chamber in accordance with engine power demands, but such systems are limited to optimizing the homogeneity of the mixture in the chamber at the moment of ignition to achieve a rapid, virtually instantaneous, knock-free combustion of the fuel. This has the disadvantage that complete vaporization of fuel is difficult to achieve in the short time available during that portion of the intake event that the fuel is being injected.

In FIG. 12, an exemplary diesel cycle is illustrated, showing how air and fuel can be separately injected into the combustion chamber to achieve the standard or high speed diesel cycle. However, it is well known that high compression ratios are required to provide sufficient activation of the fuel and air, and that elaborate precautions must be taken to insure complete vaporization of the fuel before and during combustion. Diesel engines traditionally require careful regulation and control over the starting of the supply of injected fuel to limit the amount of reaction before top dead center in order to control maximum peak pressure in the combustion chamber to avoid engine damage. On the other hand, because the charge always includes an excess of air, as the combustion progresses the proportion of oxygen with respect to unreacted fuel proceeds towards a leaner and leaner condition until, when the charge is outside the flammability limits, quenching of combustion occurs. Also, species of fuel produced by the fracturing of the fuel drops during their surface combustion cannot totally react, and characteristic smoke is emitted in the Diesel exhaust.

Figure 13:
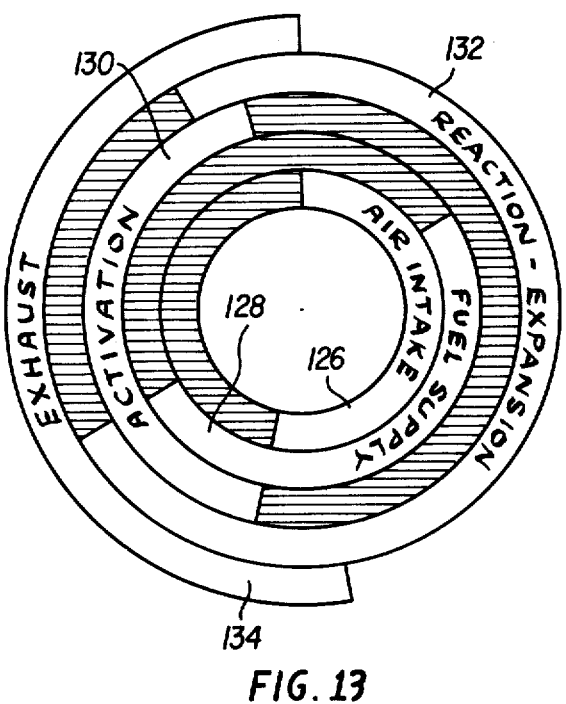
FIGS. 13 and 14 are similar to FIGS. 11 and 12, only showing the power cycle events according to the present invention in connection with spark or glow plug ignited and spontaneously ignited cycles, respectively.
Figure 14:
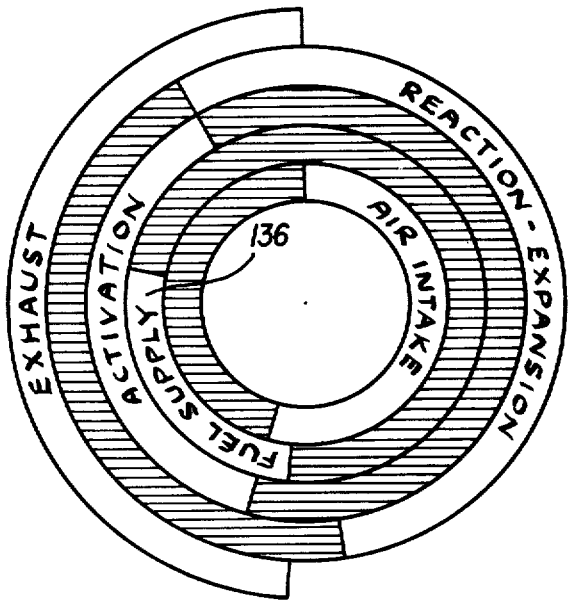

In FIGS. 13 and 14, a typical cycle according to the present invention is depicted to show the range of timing of fuel admission that is compatible with carrying out the cycle in view of the required distribution of fuel and air in the working chamber and the required control of oxygen availability during the reaction, as explained previously. A four stroke power cycle is depicted in FIG. 13 and a spark or glow plug iginition of the reactants is assumed, rather than compression ignition. Intake of air by aspiration occurs over the period of output shaft rotation corresponding to the innermost segment 126. However, fuel is admitted (segment 128) anytime during the intake and compression events between 30° to 50° after beginning of the intake and up to 30° to 40° before ignition. Supply of fuel under moderate pressure during the central period of the intake and compression events, that is from 140° after beginning the intake and up to 120° before ignition, is considered to be advantageous in some cycles, depending upon working chamber geometry and engine configuration. Activation of the reactants by compression is denoted by segment 130 and can overlap the fuel supply period, as shown. Ignition, followed by sustained reaction then follows over segment 132 followed finally by the exhaust, depicted by segment 134. Significantly, due to the distribution of fuel and air in the working chamber and the charge of reactants that is available, the peak pressure in the working chamber is controllable because of the sustained nature of the reaction that occurs in accordance with the process of this invention.

In FIG. 14, a process according to the invention is illustrated where fuel is injected into the working chamber under pressure, and ignition occurs by spontaneous initiation of the reaction by activation alone. The cycle differs essentially from that shown in FIG. 13 in that the supply of fuel, shown by segment 136, should be started at any point about midway between intake and compression, and should terminate not later than 35° to 40° before the ignition point, the latter being necessary to provide sufficient time for the required activation of the molecules of the injected fuel. Due to the distribution of the fuel and oxygen reactants in the working and sustaining chambers, and due to the sustained reaction achieved by the process, satisfactory work producing cycles using compression ignition can be achieved with compression ratios between 5:1 and 12:1, with the required control of peak pressures, without restrictions over composition of fuel and critical timing of the injection of the fuel. The compression ratio, of course, means the ratio of the sum of the maximum working and sustaining chamber volumes to the sum of the minimum working and sustaining chamber volumes.

The process of the invention enables one to carry out a chemical to thermal energy conversion in a manner that produces substantially lower proportions of noxious products of partial reaction than conventional Otto and Diesel cycles. The sustained nature of the reaction is carried out in accordance with the invention and results in the progress of the reaction towards more complete conversion of the fuel and oxygen reactants into stable final products of reaction with lower peak cylinder pressures than known combustion processes.

Comparing exhaust products of Otto, Diesel and the cycle of this invention using present day evaluation techniques, and assuming basically orthodox piston engine layouts used to carry out each cycle, the proportions of oxygen ($O_2$), carbon dioxide ($CO_2$), carbon monoxide (CO) and partially or unreacted hydrocarbon (UHC) contained in the exhaust stream of each engine can be used as an indication of the ability of each cycle to convert its respective fuel charge into thermal potential assuming that each engine is running in its natural mode without emission controls.

At full power conditions, an Otto cycle, with its virtually instantaneous combustion of a homogeneous fuel mixture, will naturally tend to produce 6 to 11% CO in the exhaust stream, 1000 to 5000 parts per million (ppm) UHC, and no $O_2$ will be present, since it has been depleted early in the combustion cycle. The exhaust of a conventional Diesel engine, also at full power demand, will normally contain 0.5 to 0.8% CO, 0.5 to 1% $O_2$, and smoke, consisting of carbon and UHC in various proportions.

At cruise power conditions, the exhaust of an Otto cycle engine will normally contain 0.5 to 1% percent CO, 200 to 1000 ppm UHC, and 0.5 to 0.8% $O_2$, and the exhaust of a Diesel engine will contain 0.3 to 0.5% CO; 500 to 1500 ppm UHC and 2 to 4% $O_2$.

At idle, the exhaust of an Otto engine will contain roughly 6 to 9% CO; 100 to 3000 ppm UHC, and no $O_2$, while a Diesel exhaust at idle normally will include 0.2 to 0.5% CO, 5 to 8% $O_2$, and various amounts of carbon and UHC displayed in smoke.

The process of this invention is carried out to produce, in the exhaust of a reciprocating piston engine carrying out the process and operating at full power conditions, a maximum of 0.2 to 3% CO, 100 to 1800 ppm UHC, and 0 to 0.2% $O_2$. At cruise power conditions, the reaction will produce a maximum of 0.1 to 1% CO, 50 to 1500 ppm UHC and 0.2 to 3.0% $O_2$ in the exhaust. At idle, the exhaust will include a maximum of 0.2 to 1.0% CO, 100 to 1000 ppm UHC and 2 to 4% $O_2$.

It is to be noted that the supply and distribution of reactants in the engine carrying out the process, and the controlled participation of the excess oxygen during the reaction, results in a supply of excess activated oxygen adjacent the reaction region when the exhaust valve of the working chamber opens. At this moment, the pressure in the working chamber rapidly drops as the reaction products expand through the valve. The excess activated oxygen at this moment flows out of the sustaining chamber and expands into the working chamber to extend the continuation of the reaction in the working chamber and in the exhaust stream. Thus, the proportion of unreacted products in the exhaust stream is diminished by this process as compared with standard internal combustion processes.

Figure 5:
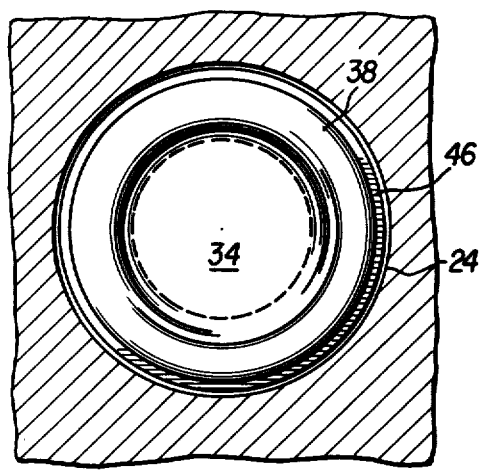
FIG. 5 is a top sectional view of the working chamber taken along line V—V in FIG. 4.

One embodiment of suitable engine apparatus for carrying out the process of the invention has been described in FIG. 4 and the related FIGS. 5-7. FIGS. 15-23 show alternate engine arrangements contemplated for carrying out the process.

Figure 15:
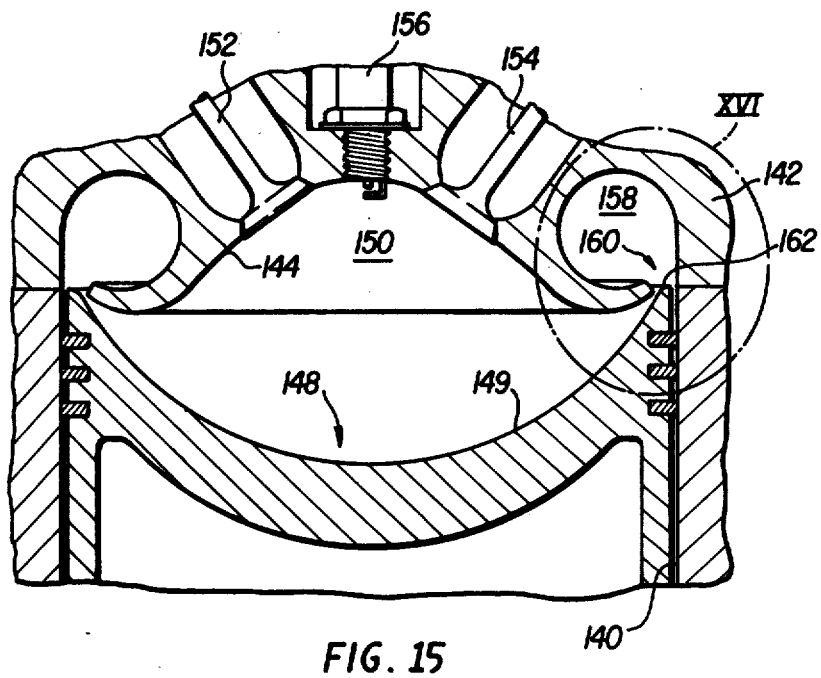
FIG. 15 shows an elevational sectional view of an alternate working chamber layout of an engine constructed in accordance with the present invention.

In FIG. 15, the working chamber is shown to include a cylinder bore 140 having a head end 142 including a concave arcuate surface area 144. A piston 146 having a closed top end 148 having a concave arcuate surface 149 reciprocates within bore 140 to vary the volume of the working chamber 150 between the closed top end 148 of the piston and the head end of the bore. Intake and exhaust valves 152, 154 are included, as is a spark plug igniter 156. The valves and igniter could be differently arranged, of course, if it is intended to operate the engine in a two cycle mode using a glow plug, for example.

Figure 16:
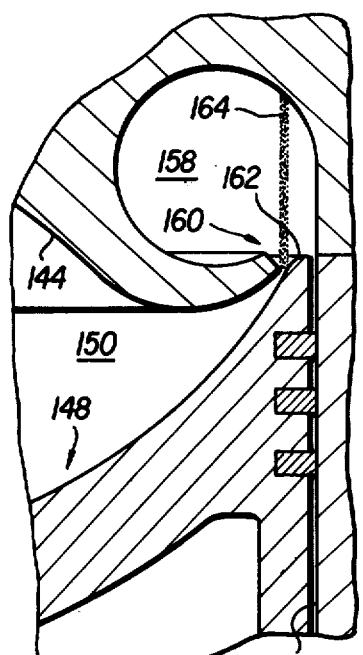
FIG. 16 shows an enlarged detailed view of the area at XVI in FIG. 15.
Figure 17:
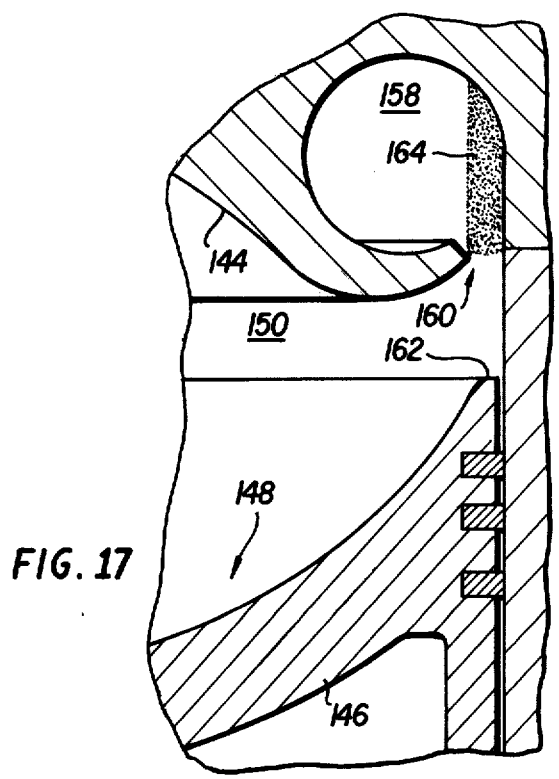
FIG. 17 is similar to FIG. 16, showing the piston below top dead center.

The sustaining chamber 158 is located adjacent and below the surface of the head and of the cylinder bore in this embodiment, and the partition gap 160 (see FIGS. 16 and 17) is located virtually in the same plane as or closely adjacent to the piston extreme top end portion 162 when the working chamber 150 is at minimum volume. The extreme top end portion 162 of the piston 146, accordingly, partially obstructs the gap 160 and effectively reduces its size as shown in FIG. 16 when the working chamber is at its minimum volume. However, when the piston moves away from the minimum volume position (FIG. 17) the full gap area 160 is open to furnish a communicating area between chambers 150 and 158. Thus, the partition volume 164 varies from a minimum value when the working chamber is at minimum volume to a maximum value when the piston moves away from its top dead center position. The partition volume 164 shown in FIG. 17 is shaded to show how it is enlarged compared to the partition volume when the piston is at its top dead center position.

It will be observed that the surfaces adjacent the gap 160 and defining the chambers 150 and 158 are all contoured to favor rebound of molecular motion in the manner described in connection with the engine configuration shown in FIG. 4, including the area adjacent the top end of the piston 146.

Figure 18:
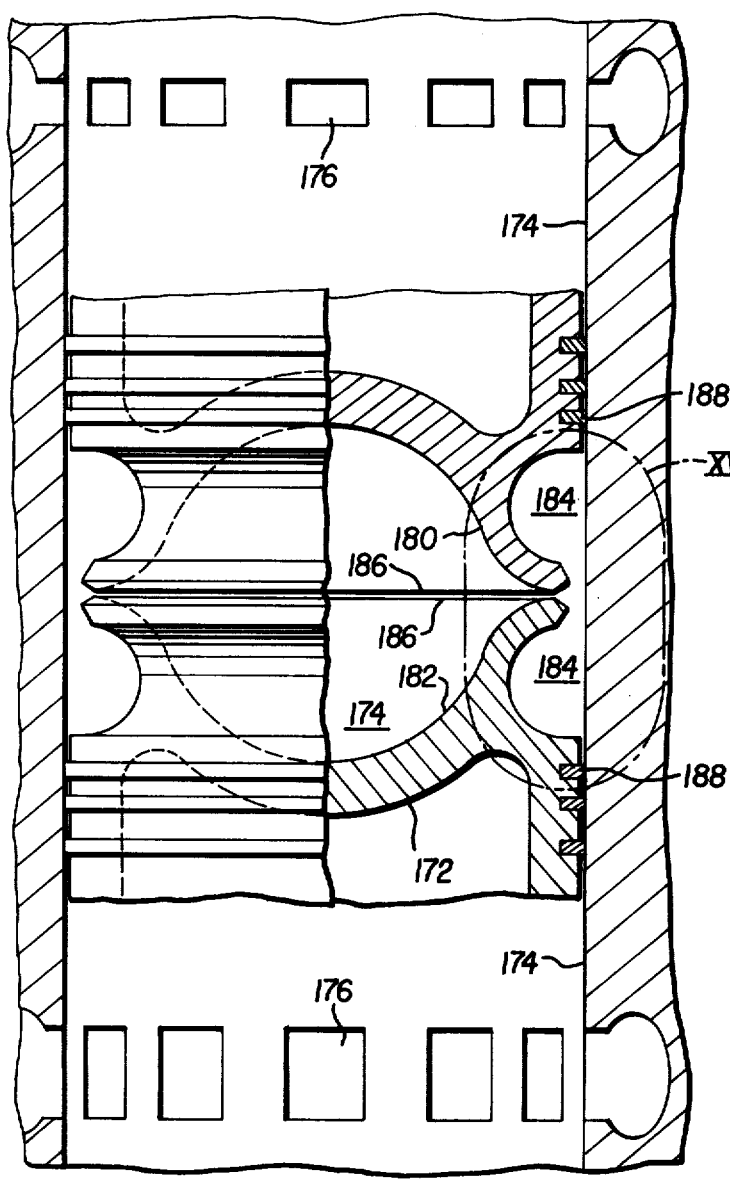
FIG. 18 is a sectional view of alternate working chamber layout constructed in accordance with this invention.
Figure 19:
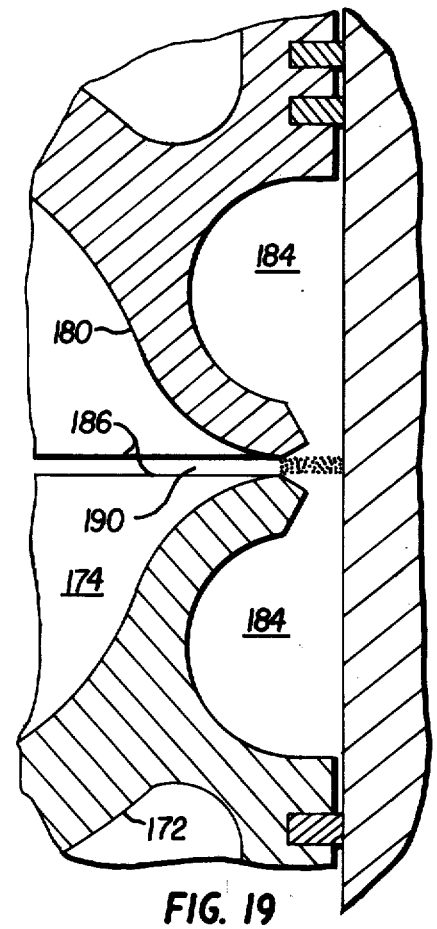
FIGS. 19 and 20 are enlarged views of the area IX in FIG. 18 with the pistons in two positions.
Figure 20:
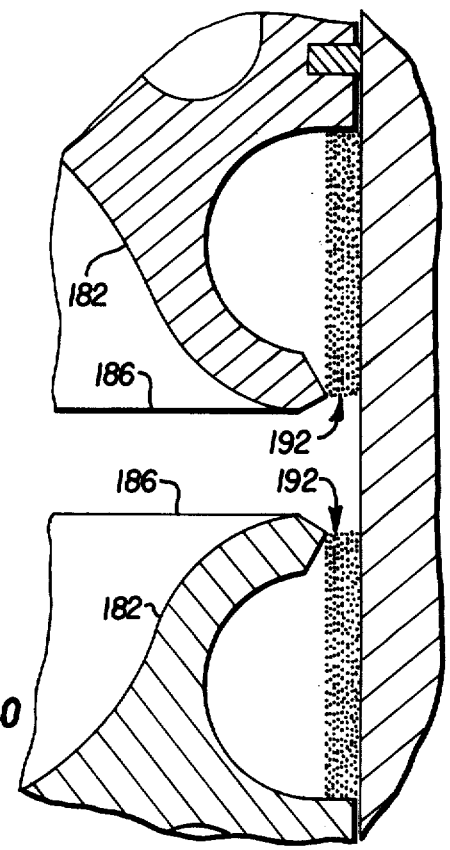

In the engine embodiment of FIGS. 18-20, two closed-ended opposed pistons 170, 172 are reciprocally mounted in a single bore 174 having reactant inlet/outlet ports 176. The working chamber 178, at minimum volume, is defined essentially by the volume between the concave arcuate end wall areas 180, 182 of the pistons 170, 172. The sustaining chamber volume 184 is divided between two volumes located in the outer peripheral area of pistons 170, 172 between the outer extreme end wall areas or top edges 186 of the pistons 170, 172 and the top sealing rings 188 of each piston. In this embodiment, the minimum gap 190 as best seen in the detail view of FIG. 19, extends between the working and sustaining chamber volumes between the top end areas 196 of pistons 170, 172 and the maximum partition gap 192 is defined as the radial gap between the top end areas of the pistons and the cylinder sidewall, as shown in FIG. 20. The respective maximum and minimum partition volumes are illustrated by the shaded areas in FIGS. 19 and 20. Thus, the steps of compressing and distributing reactants in the working and sustaining chambers includes reciprocating the pistons 172 towards and away from each other so that the gap between their extreme end wall areas varies between a minimum and maximum value.

Figure 21:
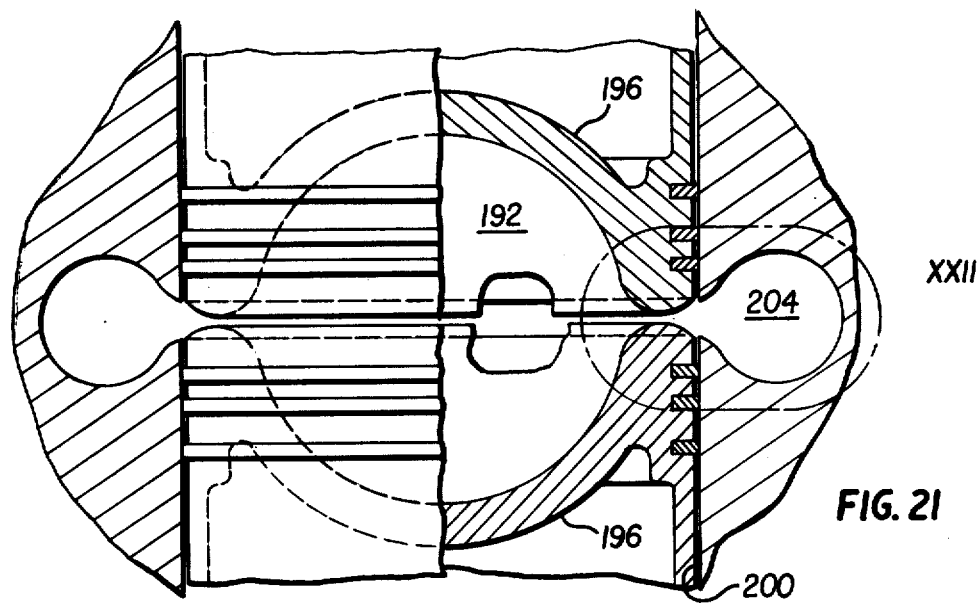
FIG. 21 is a sectional view of an alternate working chamber layout constructed in accordance with this invention.
Figure 22:
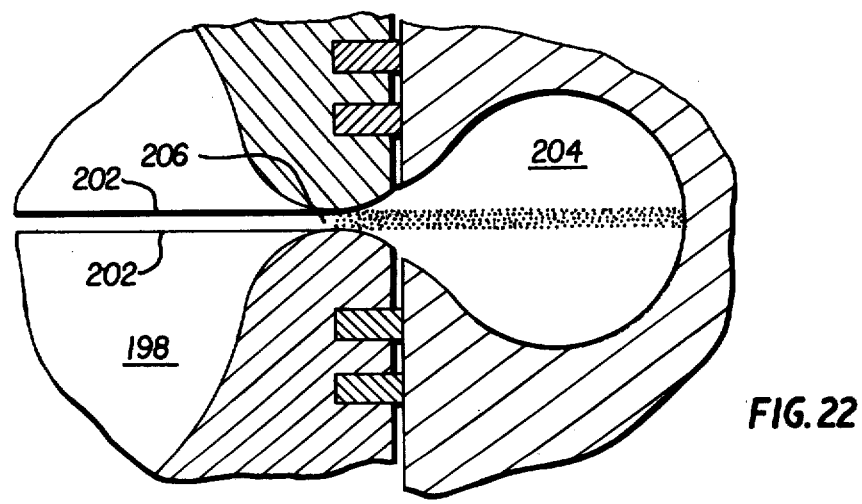
FIGS. 22 and 23 are enlarged detailed views of the area XXII in FIG. 21, with the pistons in two positions.
Figure 23:
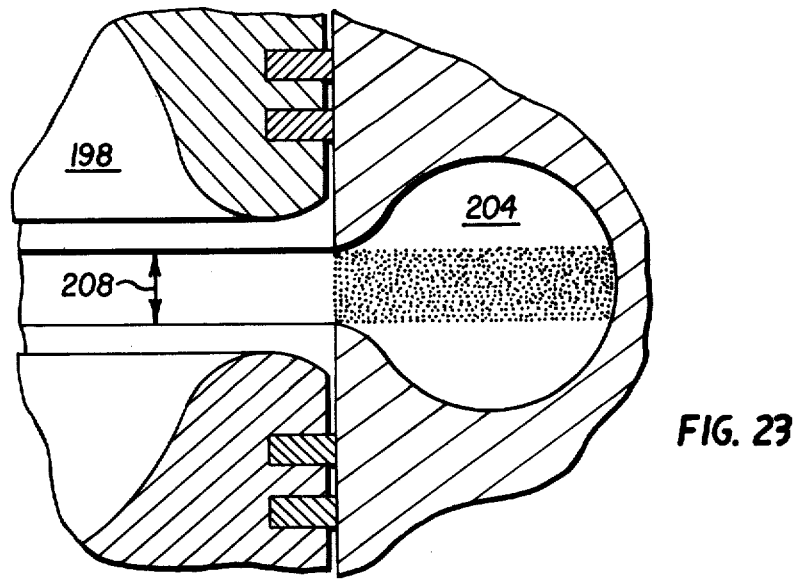

In the engine embodiment of FIGS. 21 through 23, opposing pistons 196 having a working chamber 198 between their closed top ends are reciprocally mounted in cylindrical bore 200. The extreme top end areas 202 of pistons 196 approach and recede from each other as pistons 196 reciprocate, with the distance 206 representing the minimum clearance between the piston extreme top ends. The sustaining chamber 204 in this embodiment is disposed in the cylinder sidewall and communicates with the working chamber through an aperture 208. The minimum partition gap in this embodiment is the clearance 206 between the piston extreme top end areas 202, and the maximum partition gap is represented by the width of the aperture 208 as shown in FIG. 23.

In the embodiment of engine configurations shown in FIGS. 4–7 and 15–23, various preferred approaches are illustrated by way of examples as to the manner in which the partition volume can be varied during the reaction to achieve control over the availability of activated oxygen within the respective reaction chambers. These are not intended to represent the only ways in which the partition volume can be controlled in various engine configurations, but are intended to illustrate here the range of choices available to designers of current, state-of-the-art engines as to how existing engine systems can be readily modified to carry out the process of the present invention. Clearly, the choice of mechanical expedience is as broad as the choice of engine designs themselves.

I claim:

1. A method of converting chemical energy into thermal energy using a rapid dissociative chain reaction process manifesting combustion characteristics between gaseous fuel and oxygen reactants in a variable volume working chamber of a work producing, air breathing engine and wherein individual charges of reactants are cyclically supplied to said working chamber and caused to rapidly react to generate heat for driving a cyclically moveable work producing piston or pistons in said working chamber comprising:
   (a) forming fuel and air charges of varying fuel-air ratio related to the power demand of the engine, the proportion of total air to total fuel of each charge being varied from stoichiometric at maximum power to excess air at less than maximum power;
   (b) increasing by compression the density and activation of the molecules of each charge while controlling the distribution of the fuel and oxygen reactants in the working chamber in such a manner that when the reaction is initiated, substantially all of the fuel is located in the working chamber with a proportion of air that is less than stoichiometric and in sufficient proportion to assure a maximum potential rate of reaction of available reactants, and the balance of the charge, comprising substantially only air, is located in a sustaining air reservoir chamber of substantially fixed volume located adjacent the working chamber and in communication with the latter through a molecular partition area that is variable from a minimum first area when the working chamber is at minimum volume to a second larger area when the working chamber is at greater than minimum volume, said partition area being bounded by surfaces that favor to a maximum extent rebound motion towards the working chamber of gaseous molecules approaching said area from the working chamber or passing through said area towards the working chamber;
   (c) initiating reaction of each charge by suitable means and sustaining the reaction in the working chamber while the working chamber is approaching and is at minimum volume and while it is expanding in such a manner that the reaction is carried out at a maximum rate with the proportion of reactants on the excess fuel side of stoichiometric throughout the reaction until the fuel has been depleted to the point that such reaction can no longer be sustained at a desired work producing rate with the reaction being sustained by using as a replenishment source of activated molecular oxygen such oxygen as is naturally diffused through the partition volume into the working chamber; and
   (d) exhausting the working chamber near the end of each reaction.

2. The method according to claim 1, including varying the fuel to air proportion only by varying the quantity of fuel in each charge without varying the total quantity of air.

3. The method according to claim 2, wherein the piston is connected to a rotary output shaft and including supplying fuel to the working chamber beginning not earlier than 30° to 50° after start of the respective charge intake event.

4. The method according to claim 3, including aspirating the entire fuel quantity into the working chamber during each charge intake event.

5. The method according to claim 3, including injecting at least part of the fuel of each charge directly into the working chamber volume during the compression and activation event, but not later than 30° to 40° before initiation of the reaction.

6. The method according to claim 5, including compressing and activating each charge to the point at where initiation of the reaction occurs by self-ignition.

7. The method according to claim 6, wherein the process is carried out with a total compression ratio, defined as the ratio of the sum of the maximum working and sustaining chamber volumes to the sum of the minimum working and sustaining chamber volumes, of less than 12:1.

8. The method according to claim 3, including injecting the entire fuel quantity of each charge under pressure into the working chamber during the central period of the intake and compression events.

9. The method according to claim 8, wherein said central period is approximately 140° after beginning of the intake event and 120° before the working chamber is at minimum volume.

10. The method according to claim 1, including carrying out the process with the ratio of the sustaining chamber volume to the minimum working chamber volume between 0.2 and 1.8.

11. The method according to claim 1, including carrying out the process with the width of the partition at its first area not less than 0.050 in. (1.27 mm.) and with its width at its second area not greater than 0.2 in. (5.08 mm.).

12. The method according to claim 1, including carrying out the process with a circular piston in a cylindrical bore and wherein the second partition area is between 0.05 and 0.15 times the square of the diameter of the bore.

13. The method according to claim 1, including carrying out the process with the partition volume between 0.10 and 0.35 times the total sustaining chamber volume when the partition area is at its maximum opening.

14. The method according to either of claims 10, 11 or 13, including carrying out the process with a circular piston reciprocating in a cylindrical bore, and wherein the second partition area is between 0.05 and 0.15 times the square of the diameter of the bore.

15. The method according to either of claims 10, 11 or 12, including carrying out the process with the second partition volume between 0.10 and 0.35 times the total sustaining chamber volume.

16. The method according to either of claims 11, 12 or 13, including carrying out the process with the ratio of the sustaining chamber volume to the minimum working chamber volume between 0.2 and 1.8.

17. The method according to claim 1, including carrying out the process with a circular piston reciprocating in a cylindrical bore and wherein the second partition area is between 0.05 and 0.15 times the square of the diameter of the bore, the ratio of the sustaining chamber volume to the minimum working chamber volume is between 0.2 and 1.8, and the second partition volume is between 0.05 and 0.35 times the total sustaining chamber volume.

18. The method according to claim 17, including carrying out the process with the width of the partition at its first partition area not less than 0.05 in. (1.27 mm.) and its width at its second area not more than 0.20 in. (5.08 mm.).

19. The method according to claim 1, including carrying out the process so the following maximum proportions of the products of reaction are obtained in the exhausted reactants at full engine power output: 0.2 to 3.0% CO; 100 to 1800 parts per million partially unreacted fuel and 0 to 0.2% $O_2$.

20. The method according to claim 1, including carrying out the process so the following maximum proportions of the products of reaction are obtained in the exhausted reactants at cruise engine power output: 0.1 to 1% CO; 50 to 1500 parts per million partially unreacted fuel; and 0.2 to 3% $O_2$.

21. The method according to claim 1, including carrying out the process so the following maximum proportions of the products of reaction are obtained in the exhausted reactant at idle engine power output: 0.20 to 1.0% CO; 100 to 1,000 parts per million partially unreacted fuel; and 2.0 to 4.0% $O_2$.

22. The method according to either of claims 19 or 20 including carrying out the process so the following maximum proportions of the products of reaction are obtained at idle engine power output: 0.50 to 1.0% CO; 100 to 1,000 parts per million partially unreacted fuel; and 2.0 to 4.0% $O_2$.

23. The method according to either of claims 19 or 21, including carrying out the process so the following maximum proportions of the products of reaction are obtained at engine cruise power output: 0.1 to 0.5% CO; 50 to 1500 parts per million partially unreacted fuel; and 0.2 to 3% $O_2$.

24. The method according to either of claims 20 or 21, including carrying out the process so the following maximum proportions of the products of reaction are obtained at full engine power output: 0.2 to 1.0% CO; 100 to 1800 parts per million partially unreacted fuel; and 0 to 0.2% $O_2$.

25. A work producing engine including apparatus for cyclically converting chemical energy into thermal potential and using the resultant heat to cyclically drive a moveable work producing piston in the engine, the conversion of chemical energy to thermal potential occurring by a rapid dissociative chain reaction process manifesting combustion characteristics between gaseous fuel and oxygen reactants, said piston cyclically activating reactant charges supplied to a variable volume working chamber by compressing same after a charge intake event comprising:

(a) a working chamber and a moveable piston or pistons associated therewith connected to the engine work output means and serving to convert thermally generated gaseous pressure to work during cyclical working chamber expansion events;

(b) means for supplying fuel and air to the working chamber, including means for independently controlling the proportion of fuel and air in each charge in accordance with the power demand of the engine so that the proportion of oxygen to fuel is variable from stoichiometric at full engine power demand to a proportion in excess of stoichiometric at less than full power demand;

(c) a fixed volume sustaining chamber adjacent the working chamber and isolated therefrom except through a restricted area comprising a molecular partition area that is variable from a minimum first area when the working chamber is at minimum volume to a maximum second area when the working chamber is larger than minimum volume, the partition area being defined as the partition width times the partition length, where the partition width is the shortest transverse dimension of said restricted area and the partition length is the length of said restricted area measured along the partition width;

(d) a molecular partition volume defined as the partition area times the partition depth, where the partition depth is the straight line distance between the partition width and the back wall of the sustaining chamber in a direction extending normal to the partition width;

(e) the boundary surfaces surrounding and defining said working chamber, sustaining chamber and said partition area being configured to favor to a maximum extent molecular rebound motion of molecules in the working chamber in a direction towards the working chamber volume, rebound of gaseous molecules in the sustaining chamber but not in the partition volume towards the interior of the sustaining chamber volume, and rebound of gaseous molecules passing through the partition area from the partition volume into the working chamber towards the central working chamber volume;

(f) means for controlling distribution of the reactants during the intake and activation events to cause substantially all of the fuel proportion of each charge to be located and retained in the working chamber during the activation and reaction events with the proportion of fuel to oxygen being in excess of stoichiometric to a sufficient extent to insure a maximum potential rate of reaction for the available reactants when the reaction is initiated, and to cause the remaining oxygen portion of each charge to be located in the sustaining chamber during the activation and reaction events;

(g) said molecular partition volume being dimensioned and configured to control the availability of activated oxygen molecules in the working chamber at initiation of and during the reaction process in such a manner that the reaction starts and proceeds to useful completion with the proportion of available fuel, including partially reacted fuel species, to oxygen always being in excess of stoichiometric; and (h) means for exhausting reaction products from the working chamber after each expansion event.

26. The engine according to claim 25, wherein said means for supplying fuel and air includes means for varying the total fuel proportion in each charge without substantially varying the total air in each charge, and means for controlling the timing of the fuel admission into the working chamber during each intake and activation event.

27. The engine according to claim 25, the ratio of the sustaining chamber volume to the minimum working chamber volume being between 0.2 and 1.8.

28. The engine according to claim 25, the partition width at its minimum area being not less than 0.050 inch (1.27 mm) and at its maximum area not greater than 0.20 inch (5.08 mm).

29. The engine according to claim 25, the piston or pistons reciprocating within a cylindrical working chamber and the maximum partition area being between 0.05 and 0.15 times the square of the diameter of the working chamber.

30. The engine according to claim 25, the partition volume being between 0.10 and 0.35 times the total sustaining chamber volume when the partition area is at its maximum.

31. The engine according to either of claims 27, 28 or 29, wherein the piston or pistons reciprocates or reciprocate within a cylindrical working chamber and the maximum partition area is between 0.05 and 0.15 times the square of the diameter of the working chamber.

32. The engine according to either of claims 27, 28 or 29, and wherein the partition volume is between 0.10 and 0.35 times the total sustaining chamber volume when the partition area is at its maximum.

33. The engine according to either of claims 28, 29, or 30, the ratio of the sustaining chamber volume to the minimum working chamber volume being between 0.2 and 1.8.

34. The engine according to claim 25, wherein the ratio of the sustaining chamber volume to the minimum working chamber volume is between 0.2 and 1.8; the width of the partition at its minimum area being not less than 0.050 inch (1.27 mm) and at its maximum area not greater than 0.20 inch (5.08 mm); the piston or pistons reciprocates or reciprocate within a cylindrical working chamber and the maximum partition area is between 0.05 and 0.15 times the square of the diameter of the working chamber; and the partition volume being between 0.10 and 0.35 times the total sustaining chamber volume when the partition is at its maximum area.

35. A work producing engine including apparatus for cyclically converting chemical energy into thermal potential and using the resultant heat to cyclically drive a moveable work producing piston in the engine, the conversion of chemical energy to thermal potential occurring by a rapid dissociative chain reaction process manifesting combustion characteristics between gaseous fuel and oxygen reactants, said piston cyclically activating reactant charges supplied to a variable volume working chamber by compressing same after a charge intake event comprising:

(a) a working chamber and a moveable piston or pistons associated therewith connected to the engine work output means and serving to convert thermally generated gaseous pressure to work during cyclical working chamber expansion events;

(b) means for supplying fuel and air to the working chamber, including means for independently controlling the proportion of fuel and air in each charge in accordance with the power demand of the engine so that the proportion of oxygen to fuel is variable from stoichiometric at full engine power demand to a proportion in excess of stoichiometric at less than full power demand;

(c) a fixed volume sustaining chamber adjacent the working chamber and isolated therefrom except through a restricted area comprising a molecular partition area that is variable from a minimum first area when the working chamber is at minimum volume to a maximum second area when the working chamber is larger than minimum volume, the partition area being defined as the partition width times the partition length, where the partition width is the shortest transverse dimension of said restricted area and the partition length is the length of said restricted area measured along the partition width;

(d) a molecular partition volume defined as the partition area times the partition depth, where the partition depth is the straight line distance between the partition width and the back wall of the sustaining chamber in a direction extending normal to the partition width;

(e) the boundary surfaces surrounding and defining said working chamber, sustaining chamber and said partition area being configured to favor to a maximum extend molecular rebound motion of molecules in the working chamber in a direction towards the working chamber volume, rebound of gaseous molecules in the sustaining chamber but not in the partition volume towards the interior of the sustaining chamber volume, and rebound of gaseous molecules passing through the partition area from the partition volume into the working chamber towards the central working chamber volume;

(f) means for controlling distribution of the reactants during the intake and activation events to cause substantially all of the fuel proportion of each charge to be located and retained in the working chamber during the activation and reaction events with the proportion of fuel to oxygen being in excess of stoichiometric to a sufficient extent to insure a maximum potential rate of reaction for the available reactants when the reaction is initiated, and to cause the remaining oxygen portion of each charge to be located in the sustaining chamber during the activation and reaction events;

(g) said molecular partition volume being dimensioned and configured to control the availability of activated oxygen molecules in the working chamber at initiation of and during the reaction process in such a manner that the reaction starts and proceeds to useful completion with the proportion of available fuel, including partially reacted fuel species, to oxygen always being in excess of stoichiometric;

(h) means for exhausting reaction products from the working chamber after each expansion event;

(i) said piston comprising a single piston reciprocally mounted within a cylindrical bore with the working chamber between a closed head end of the bore and a closed top end of the piston, the bore head end including an inwardly converging sidewall area and a generally concave arcuate end area, the piston including an upper compression seal and a generally concave arcuate top end; the sustaining chamber disposed in the peripheral area of the piston below its top end between said top end and said compression seal; a radial clearance gap between the piston top end and the cylinder wall that constitutes said molecular partition width that varies as the piston top end cyclically approaches and recedes from said converging cylinder sidewall area to vary said partition area, said clearance gap being a minimum when the working chamber is at minimum volume.

36. The engine according to claim 35, said sustaining chamber and clearance gap extending over a continuous portion of the circumference of the piston.

37. The engine according to claim 35, the peripheral area of the piston end adjacent the gap forming, with the inner cylinder bore sidewall, a converging passageway, with an arcuate surface leading to the gap from the working chamber, the arc of said arcuate surface and the solid angles between the surfaces leading to the gap from the working chamber promoting rebound of activated molecules originally moving towards the gap from the working chamber back towards said working chamber rather than through the gap towards the sustaining chamber.

38. The engine according to claim 37, the interior walls of the sustaining chamber being generally circular in cross-section as viewed across the depth of the sustaining chamber along its length, with the cylinder sidewall forming the outer interior peripheral wall of the sustaining chamber.

39. The engine according to claim 38, the piston top end surfaces adjacent the partition area diverging sharply away from said partition area on either side thereof.

40. The engine according to claim 35, wherein a single piston is reciprocally mounted within a cylindrical bore, with the working chamber between a closed head end of the bore and a closed top end of the piston, the bore head end including an inwardly converging sidewall area and a concave arcuate end area, the piston including an upper compression seal and a concave arcuate top end area; the sustaining chamber disposed in the peripheral area of the bore head end; the length of the partition area extending along the periphery of the bore head end; a peripheral area of the piston top end lying adjacent the partition area in partially blocking relationship when the working chamber is at minimum volume and away from the partition area when the working chamber is larger than minimum volume.

41. The engine according to claim 40, the surfaces leading towards the partition area having curvatures and angles therebetween that favor maximum rebound of molecular motion back towards the respective chamber from whence the moles approached said partition area, except those molecules moving straight through said partition volume.

42. The engine according to claim 41, said piston peripheral top end area projecting beyond the remaining piston top end area.

43. The engine according to claim 35, wherein a pair of closed-ended pistons are reciprocally mounted within a single cylindrical bore and together between their closed top ends and the bore define said working chamber; the piston top ends each having concave arcuate central portions and respective peripheral top edge portions that are radially spaced from the bore wall to define maximum partition widths; the pistons having a top compression sealing means and said sustaining chamber lying in the peripheral area of the top end of each piston between said peripheral edge portion and said compression sealing means of each piston; the distance between said piston peripheral top edge portions when the working chamber is at minimum volume defining a minimum partition width.

44. The engine according to claim 43, said minimum and maximum partition areas comprising continuous annular openings respectively between the piston peripheral top edge portions, and between the piston top ends and the cylinder bores, respectively, the cylinder bores constituting one of the walls enclosing the sustaining chambers.

45. The engine according to claim 35, wherein a pair of closed ended pistons are reciprocally mounted within a cylindrical bore and together between their closed top ends and the bore define said working chamber; the piston top ends each having a concave arcuate central portion and a peripheral top area that extends beyond the central portion; the minimum working chamber volume being defined as the volume within the cylinder bore and the piston top ends when said top ends are closest to each other; said sustaining chamber disposed within the bore sidewall and normally in communication with the working chamber through an opening in the sidewall defining said maximum partition area, said opening being located opposite the location of the clearance between the piston peripheral top areas when the working chamber is at minimum volume, said clearance defining the partition width at its minimum area.

46. The engine according to either of claims 39, 42 or 45 wherein the ratio of the sustaining chamber volume to the minimum chamber volume is between 0.2 and 1.8; the width of the partition at its minimum area being not less than 0.050 inch (1.27 mm) and at its maximum area not greater than 0.20 inch (5.08 mm); the maximum partition area is between 0.05 and 0.15 times the square of the diameter of the working chamber; and the partition volume is between 0.10 and 0.35 times the total sustaining chamber volume when the partition area is maximum.

47. A method of converting chemical energy into thermal energy using a rapid dissociative chain reaction process manifesting combustion characteristics between gaseous fuel and oxygen reactants in a variable volume working chamber of a work producing, air breathing engine and wherein individual charges of reactants are cyclically supplied to said working chamber and caused to rapidly react to generate heat for driving a cyclically moveable work producing piston or pistons in said working chamber comprising:

(a) forming fuel and air charges of varying fuel-air ratio related to the power demand of the engine, the proportion of total air to total fuel of each charge being varied from stoichiometric at maximum power to excess air at less than maximum power;

(b) increasing by compression the density and activation of the molecules of each charge while controlling the distribution of the fuel and oxygen reactants in the working chamber in such a manner that when the reaction is initiated, substantially all of the fuel is located in the working chamber with a proportion of air that is less than stoichiometric and in sufficient proportion to assure a maximum potential rate of reaction of available reactants, and the balance of the charge, comprising substantially only air, is located in a sustaining air reservoir in communication with the latter through a molecular partition area that is variable from a minimum first area when the working chamber is at minimum volume to a second larger area when the working chamber is at greater than minimum volume, said partition area being bounded by surfaces that favor to a maximum extent rebound motion towards the working chamber of gaseous molecules approaching said area from the working chamber or passing through said area towards the working chamber;

(c) initiating reaction of each charge by suitable means and sustaining the reaction in the working chamber while the working chamber is approaching and is at minimum volume and while it is expanding in such a manner that the reaction is carried out at a maximum rate with the proportion of reactants on the excess fuel side of stoichiometric throughout the reaction until the fuel has been depleted to the point that such reaction can no longer be sustained at a desired producing rate, with the reaction being sustained by using as a replenishment source of activated molecular oxygen such oxygen as is naturally diffused through the partition volume into the working chamber;

(d) exhausting the working chamber near the end of each reaction;

(e) said work producing piston comprising a reciprocating member having a closed top end and being mounted within a cylindrical bore having straight and inwardly converging sidewall portions with the inwardly converging portion being located in that portion of the bore that is adjacent the top of the piston when the working chamber is at minimum volume, the straight portion of the bore being located along the rest of the cylinder length, the sustaining air chamber being located in the upper peripheral area of the piston and the partition area constituting a clearance gap area between the top of the piston and the cylindrical bore, the step of compressing and controlling the distribution of the reactants including reciprocating the piston towards and away from the convergent portion of the bore to the extent that the partition area is varied from said minimum first area to said second larger area by moving the top of the piston towards and away from the inwardly converging bore sidewall as the working chamber volume varies between minimum volume and larger than minimum volume.

48. A method of converting chemical energy into thermal energy using a rapid dissociative chain reaction process manifesting combustion characteristics between gaseous fuel and oxygen reactants in a variable volume working chamber of a work producing, air breathing engine and wherein individual charges of reactants are cyclically supplied to said working chamber and caused to rapidly react to generate heat for driving a cyclically moveable work producing piston or pistons in said working chamber comprising:

(a) forming fuel and air charges of varying fuel-air ratio related to the power demand of the engine, the proportion of total air to total fuel of each charge being varied from stoichiometric at maximum power to excess air at less than maximum power;

(b) increasing by compression the density and activation of the molecules of each charge while controlling the distribution of the fuel and oxygen reactants in the working chamber in such a manner that when the reaction is initiated, substantially all of the fuel is located in the working chamber with a proportion of air that is less than stoichiometric and in sufficient proportion to assure a maximum potential rate of reaction of available reactants, and the balance of the charge, comprising substantially only air, is located in a sustaining air reservoir in communication with the latter through a molecular partition area that is variable from a minimum first area when the working chamber is at minimum volume to a second larger area when the working chamber is at greater than minimum volume, said partition area being bounded by surfaces that favor to a maximum extent rebound motion towards the working chamber of gaseous molecules approaching said area from the working chamber or passing through said area towards the working chamber;

(c) initiating reaction of each charge by suitable means and sustaining the reaction in the working chamber while the working chamber is approaching and is at minimum volume and while it is expanding in such a manner that the reaction is carried out at a maximum rate with the proportion of reactants on the excess fuel side of stoichiometric throughout the reaction until the fuel has been depleted to the point that such reaction can no longer be sustained at a desired work producing rate, with the reaction being sustained by using as a replenishment source of activated molecular oxygen such oxygen as is naturally diffused through the partition volume into the working chamber;

(d) exhausting the working chamber near the end of each reaction;

(e) said work producing piston comprising a member having a closed top end portion and being reciprocally mounted within a cylinder bore terminating at a head end constituting at least one fixed wall of the working chamber, the piston having an extreme top end portion extending beyond the remaining adjacent top end portion, and the sustaining chamber being located adjacent and below the surface of said head end of the cylinder with the partition area located adjacent the piston extreme top end portion when the working chamber is at minimum volume, the step of compressing and controlling the distribution of the reactants being carried out by reciprocating the piston towards and away from the cylinder head end to the extent that rthe partition area is varied by moving the piston extreme top end portion into and out of blocking relationship with the partition area.

49. A method of converting chemical energy into thermal energy using a rapid dissociative chain reaction process manifesting combustion characteristics between gaseous fuel and oxygen reactants in a variable volume working chamber of a work producing, air breathing engine and wherein individual charges of reactants are cyclically supplied to said working chamber and caused to rapidly react to generate heat for driving a cyclically moveable work producing piston or pistons in said working chamber comprising:

(a) forming fuel and air charges of varying fuel-air ratio related to the power demand of the engine, the proportion of total air to total fuel of each charge being varied from stoichiometric at maximum power to excess air at less than maximum power;

(b) increasing by compression the density and activation of the molecules of each charge while controlling the distribution of the fuel and oxygen reactants in the working chamber in such a manner that when the reaction is initiated, substantially all of the fuel is located in the working chamber with a proportion of air that is less than stoichiometric and in sufficient proportion to assure a maximum potential rate of reaction of available reactants, and the balance of the charge, comprising substantially only air, is located in a sustaining air reservoir in communication with the latter through a molecular partition area that is variable from a minimum first area when the working chamber is at minimum volume to a second larger area when the working chamber is at greater than minimum volume, said partition area being bounded by surfaces that favor to a maximum extent rebound motion towards the working chamber of gaseous molecules approaching said area from the working chamber or passing through said area towards the working chamber;

(c) initiating reaction of each charge by suitable means and sustaining the reaction in the working chamber while the working chamber is approaching and is at minimum volume and while it is expanding in such a manner that the reaction is carried out at a maximum rate with the proportion of reactants on the excess fuel side of stoichiometric throughout the reaction until the fuel has been depleted to the point that such reaction can no longer be sustained at a desired work producing rate, with the reaction being sustained by using as a replenishment source of activated molecular oxygen such oxygen as is naturally diffused through the partition volume into the working chamber;

(d) exhausting the working chamber near the end of each reaction;

(e) said work producing pistons including two closed-ended, opposed pistons reciprocally mounted to move towards and away from each other within a single cylindrical bore and arranged to form the working chamber centrally between the pistons and the cylinder walls; said sustaining chamber comprising an annular chamber located peripherally about each of the pistons adjacent their respective closed end walls and wherein the piston end walls have extreme end wall areas extending beyond the remaining adjacent end wall areas, the area of communication between the working chamber volume and the sustaining chamber volume being between the peripheral closed end area of each piston and the cylinder wall when the working chamber is larger than minimum volume, and between the said respective piston extreme end wall areas when the working chamber is at minimum volume, wherein the steps of compressing and controlling distribution of the reactants includes reciprocating the pistons towards and away from each other so that the gap between their extreme end wall areas defines the said minimum first partition area when the working chamber is at minimum volume and the radial gap between the closed end of each piston and the cylinder wall defines the second larger partition area when the pistons are located away from each other.

50. A method of converting chemical energy into thermal energy using a rapid dissociative chain reaction process manifesting combustion characteristics between gaseous fuel and oxygen reactants in a variable volume working chamber of a work producing, air breathing engine and wherein individual charges of reactants are cyclically supplied to said working chamber and caused to rapidly react to generate heat for driving a cyclically moveable work producing piston or pistons in said working chamber comprising:

(a) forming fuel and air charges of varying fuel-air ratio related to the power demand of the engine, the proportion of total air to total fuel of each charge being varied from stoichiometric at maximum power to excess air at less than maximum power;

(b) increasing by compression the density and activation of the molecules of each charge while controlling the distribution of the fuel and oxygen reactants in the working chamber in such a manner that when the reaction is initiated, substantially all of the fuel is located in the working chamber with a proportion of air that is less than stoichiometric and in sufficient proportion to assure a maximum potential rate of reaction of available reactants, and the balance of the charge, comprising substantially only air, is located in a sustaining air reservoir in communication with the latter through a molecular partition area that is variable from a minimum first area when the working chamber is at minimum volume to a second larger area when the working chamber is at greater than minimum volume, said partition area being bounded by surfaces that favor to a maximum extent rebound motion towards the working chamber of gaseous molecules approaching said area from the working chamber or passing through said area towards the working chamber;

(c) initiating reaction of each charge by suitable means and sustaining the reaction in the working chamber while the working chamber is approaching and is at minimum volume and while it is expanding in such a manner that the reaction is carried out at a maximum rate with the proportion of reactants on the excess fuel side of stoichiometric throughout the reaction until the fuel has been depleted to the point that such reaction can no longer be sustained at a desired work producing rate, with the reaction being sustained by using as a replenishment source of activated molecular oxygen such oxygen as is naturally diffused through the partition volume into the working chamber;

(d) exhausting the working chamber near the end of each reaction;

(e) said work producing pistons including two close ended, opposed pistons reciprocally mounted to move towards and away from each other within a single cylindrical bore and arranged to form the working chamber centrally between the piston end walls, the pistons each having an extreme end wall area that extends beyond the remaining piston end wall area; said sustaining chamber disposed in the cylinder sidewall and communicating with the working chamber through an aperture in the cylinder sidewall that constitutes said second maximum partition area, wherein the steps of compressing and controlling the distribution of the reactants comprises recirocating the pistons towards and away from each other so that at minimum working chamber volume the extreme piston end areas form said first minimum partition area directly opposite said aperture in the cylinder sidewall to effectively reduce said second maximum partition area, said aperture providing said maximum partition area when the pistons are located away from each other.

* * * * *